US012793900B2

(12) United States Patent
Yasuda et al.

(10) Patent No.: US 12,793,900 B2
(45) Date of Patent: Nov. 10, 2026

(54) MULTILAYER CERAMIC ELECTRONIC COMPONENT

(71) Applicant: Murata Manufacturing Co., Ltd., Nagaokakyo (JP)

(72) Inventors: Tatsunori Yasuda, Nagaokakyo (JP); Kouhei Semasa, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 285 days.

(21) Appl. No.: 18/619,250

(22) Filed: Mar. 28, 2024

(65) Prior Publication Data

US 2024/0242890 A1 Jul. 18, 2024

Related U.S. Application Data

(63) Continuation of application No. PCT/JP2023/020988, filed on Jun. 6, 2023.

(30) Foreign Application Priority Data

Aug. 5, 2022 (JP) ................................ 2022-125590

(51) Int. Cl.
*H01G 4/30* (2006.01)
*H01G 4/008* (2006.01)
(Continued)

(52) U.S. Cl.
CPC ............. *H01G 4/30* (2013.01); *H01G 4/2325* (2013.01); *H01G 4/0085* (2013.01); *H01G 4/012* (2013.01);
(Continued)

(58) Field of Classification Search
CPC ...... H01G 4/30; H01G 4/2325; H01G 4/0085; H01G 4/012; H01G 4/1227; H01G 4/1236
See application file for complete search history.

(56) References Cited

U.S. PATENT DOCUMENTS 6,475,317 B1 11/2002 Baba et al.
9,997,297 B2 * 6/2018 Okai .................... H01G 5/0134
(Continued)

FOREIGN PATENT DOCUMENTS

JP H06310365 A 11/1994
JP 2000311831 A 11/2000
(Continued)

OTHER PUBLICATIONS

International Search Report in PCT/JP2023/020988, mailed Sep. 5, 2023, 3 pages.
(Continued)

*Primary Examiner* — Michael P McFadden
(74) *Attorney, Agent, or Firm* — Keating & Bennett, LLP

(57) ABSTRACT

A multilayer ceramic capacitor includes a multilayer body, and first and second external electrodes on both ends of the multilayer body. A first end surface of the multilayer body includes first protruded portions partially protruding in one of length directions, from a corresponding one of first step layers, in a region including a corresponding one of dielectric layers being adjacent to at least one side, in the lamination directions, of the corresponding one of the first step layers, and a second end surface including second protruded portions each partially protruding in another one of the length directions, from a corresponding one of second step layers, in a region including another corresponding one of the dielectric layers being adjacent to at least one side, in the lamination directions, of the corresponding one of the second step layers.

20 Claims, 11 Drawing Sheets

(51) Int. Cl.
*H01G 4/012* (2006.01)
*H01G 4/12* (2006.01)
*H01G 4/232* (2006.01)

(52) U.S. Cl.
CPC ......... *H01G 4/1227* (2013.01); *H01G 4/1236* (2013.01)

(56) References Cited

U.S. PATENT DOCUMENTS

| | | | | |
|---|---|---|---|---|
| 2002/0090335 | A1* | 7/2002 | Harada | C01G 23/006 423/598 |
| 2006/0043523 | A1 | 3/2006 | Ito et al. | |
| 2006/0214263 | A1* | 9/2006 | Kojima | H01G 4/30 257/532 |
| 2008/0145551 | A1* | 6/2008 | Kunishi | H01G 4/2325 427/430.1 |
| 2008/0304204 | A1* | 12/2008 | Suzuki | H01G 4/30 361/321.3 |
| 2013/0100579 | A1 | 4/2013 | Morito | |
| 2014/0347783 | A1* | 11/2014 | Kisumi | H01G 4/2325 427/79 |
| 2015/0340156 | A1* | 11/2015 | Masunari | H01G 4/1227 361/301.4 |
| 2016/0087189 | A1* | 3/2016 | Lee | H01G 4/30 29/25.35 |
| 2016/0141103 | A1* | 5/2016 | Hamanaka | H01G 4/232 361/301.4 |
| 2016/0268046 | A1* | 9/2016 | Nishisaka | H01G 4/232 |
| 2018/0061577 | A1* | 3/2018 | Yasuda | H01G 4/0085 |
| 2018/0301281 | A1* | 10/2018 | Park | H01G 4/012 |
| 2019/0006107 | A1* | 1/2019 | Kim | H01G 4/012 |
| 2019/0131074 | A1* | 5/2019 | Mizuno | H01G 4/0085 |
| 2021/0210285 | A1 | 7/2021 | Sasabayashi et al. | |
| 2022/0148812 | A1 | 5/2022 | Tsutsui et al. | |

FOREIGN PATENT DOCUMENTS

| | | | |
|---|---|---|---|
| JP | 2006073623 | A | 3/2006 |
| JP | 2010040628 | A | 2/2010 |
| JP | 2012227198 | A | 11/2012 |
| JP | 2021111659 | A | 8/2021 |
| JP | 2022075308 | A | 5/2022 |

OTHER PUBLICATIONS

Written Opinion in PCT/JP2023/020988, mailed Sep. 5, 2023, 4 pages.

* cited by examiner

MULTILAYER CERAMIC ELECTRONIC COMPONENT

CROSS REFERENCE TO RELATED APPLICATIONS

This application claims the benefit of priority to Japanese Patent Application No. 2022-125590 filed on Aug. 5, 2022 and is a Continuation Application of PCT Application No. PCT/JP2023/020988 filed on Jun. 6, 2023. The entire contents of each application are hereby incorporated herein by reference.

BACKGROUND OF THE INVENTION

1. Field of the Invention

The present invention relates to multilayer ceramic electronic components.

2. Description of the Related Art

Conventionally, multilayer ceramic capacitors have been known as multilayer ceramic electronic components. Generally, a multilayer ceramic capacitor has a structure including a multilayer body that is a fired body alternately laminated with a plurality of dielectric layers including ceramic layers and a plurality of internal electrode layers, and external electrodes provided on both end surfaces of the multilayer body, and has a desired capacitance in accordance with a number of the layers and a thickness of each of the dielectric layers. Japanese Unexamined Patent Application Publication No. 2006-73623 discloses a multilayer ceramic capacitor in which extension portions of a plurality of internal electrode layers, which define and function as coupling portions to external electrodes, are alternately disposed on an end surface and another end surface in lamination directions, and ends on an opposite side to the extension portions have portions that do not extend to the end surfaces and that are not disposed with the internal electrode layers.

Since there are portions where the internal electrode layers described above are not disposed in the structure of the multilayer ceramic capacitor disclosed in Japanese Unexamined Patent Application Publication No. 2006-73623, ends in length directions of the plurality of internal electrode layers are bent inwardly in one of the lamination directions, a thickness of each of both ends in the length directions of the multilayer body is decreased, thereby possibly and easily leading to short circuits in the internal electrode layers and lowered reliability under high temperatures and high loads. In particular, as a thickness of a dielectric layer becomes thinner and a number of laminated internal electrode layers and dielectric layers becomes greater, there is a tendency that short circuits easily occur in the internal electrode layers, which decreases reliability. To address these issues described above, multilayer ceramic capacitors have been manufactured by using a ceramic material to dispose a step layer in a space region that may become a portion where no internal electrode layer is disposed to prevent an internal electrode layer from bending. Note herein that, although the step layer is exposed at an end surface of a multilayer body disposed with external electrodes, its fixing power with the external electrodes is low, which may cause the external electrodes to peel off, possibly decreasing reliability in moisture resistance, and thus there is a need for improvements.

SUMMARY OF THE INVENTION

Example embodiments of the present invention provide highly reliable multilayer ceramic electronic components with improved fixing power of external electrodes with respect to a multilayer body.

A multilayer ceramic electronic component according to an example embodiment of the present invention includes a multilayer body including a plurality of ceramic layers laminated in lamination directions, a first main surface and a second main surface facing each other in the lamination directions, a first side surface and a second side surface facing each other in width directions orthogonal or substantially orthogonal to the lamination directions, a first end surface and a second end surface facing each other in length directions orthogonal or substantially orthogonal to the lamination directions and the width directions, first internal electrode layers alternately laminated with the plurality of ceramic layers, the first internal electrode layers being exposed at the first end surface, second internal electrode layers alternately laminated with the plurality of ceramic layers, the second internal electrode layers being exposed at the second end surface, first step layers each located in a first step region in which a corresponding one of the second internal electrode layers is not located, between a pair of the ceramic layers facing each other via the corresponding one of the second internal electrode layers, the first step layers being exposed at the first end surface, and second step layers each located in a second step region in which a corresponding one of the first internal electrode layers is not located, between a pair of the ceramic layers facing each other via the corresponding one of the first internal electrode layers, the second step layers being exposed at the second end surface, a first external electrode on the first end surface, the first external electrode partially covering the first main surface, the second main surface, the first side surface, and the second side surface from the first end surface, the first external electrode being coupled to the first internal electrode layers, and a second external electrode on the second end surface, the second external electrode being provided to partially cover the first main surface, the second main surface, the first side surface, and the second side surface from the second end surface, the second external electrode being coupled to the second internal electrode layers, in which the first end surface includes first protruded portions each partially protruding in one of the length directions, from a corresponding one of the first step layers, in a region including a corresponding one of the ceramic layers, the corresponding one of the ceramic layers being adjacent to at least one side, in the lamination directions, of the corresponding one of the first step layers, and the second end surface includes second protruded portions each partially protruding in another one of the length directions, from a corresponding one of the second step layers, in a region including another corresponding one of the ceramic layers, the other corresponding one of the ceramic layers being adjacent to at least one side, in the lamination directions, of the corresponding one of the second step layers.

According to example embodiments of the present invention, it is possible to provide highly reliable multilayer ceramic electronic components with improved fixing power of external electrodes with respect to a multilayer body.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention will be described in detail below with reference to the drawings.

Figure 1:
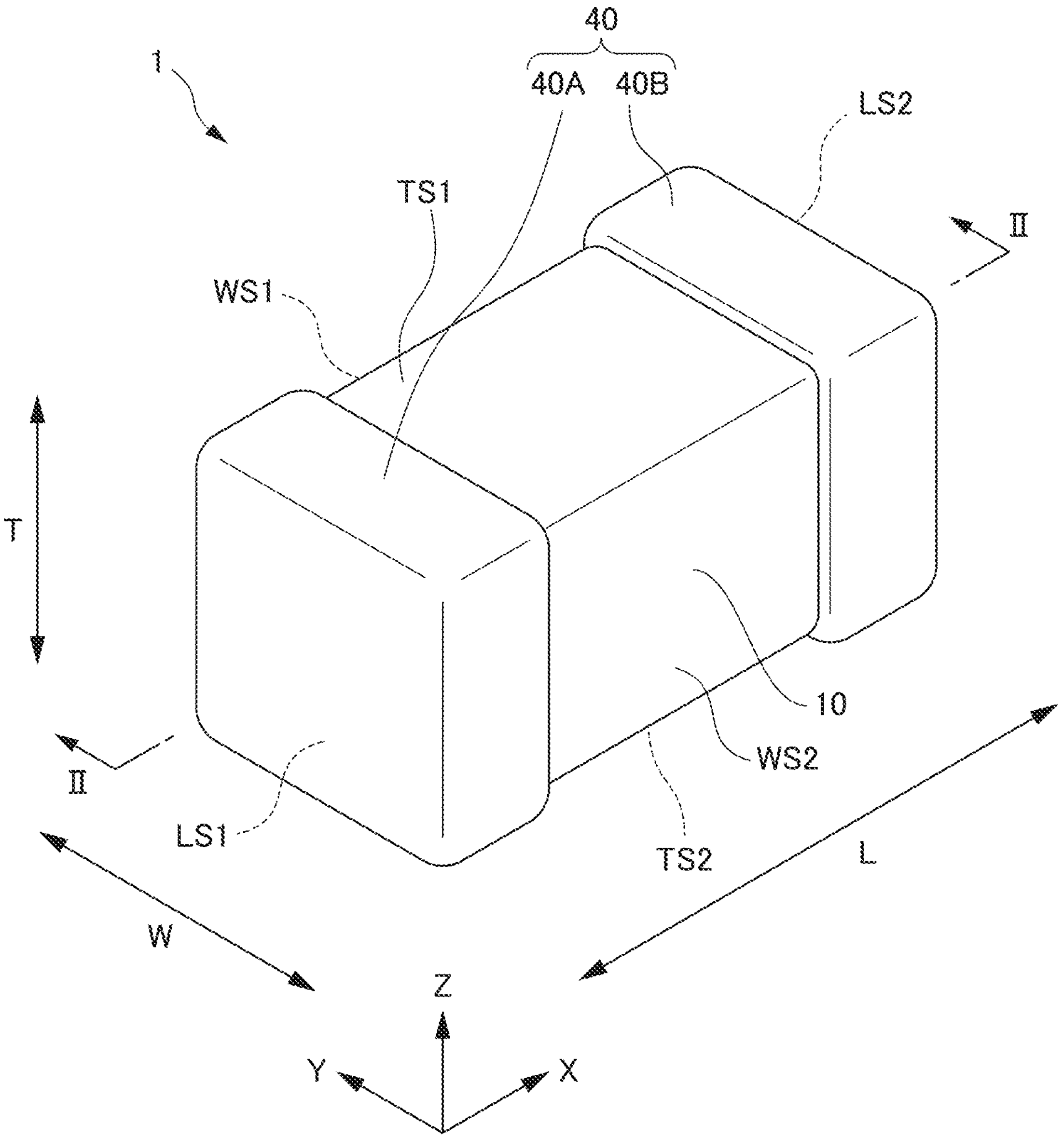
FIG. 1 is a perspective appearance view of a multilayer ceramic capacitor according to an example embodiment of the present invention.
Figure 2:
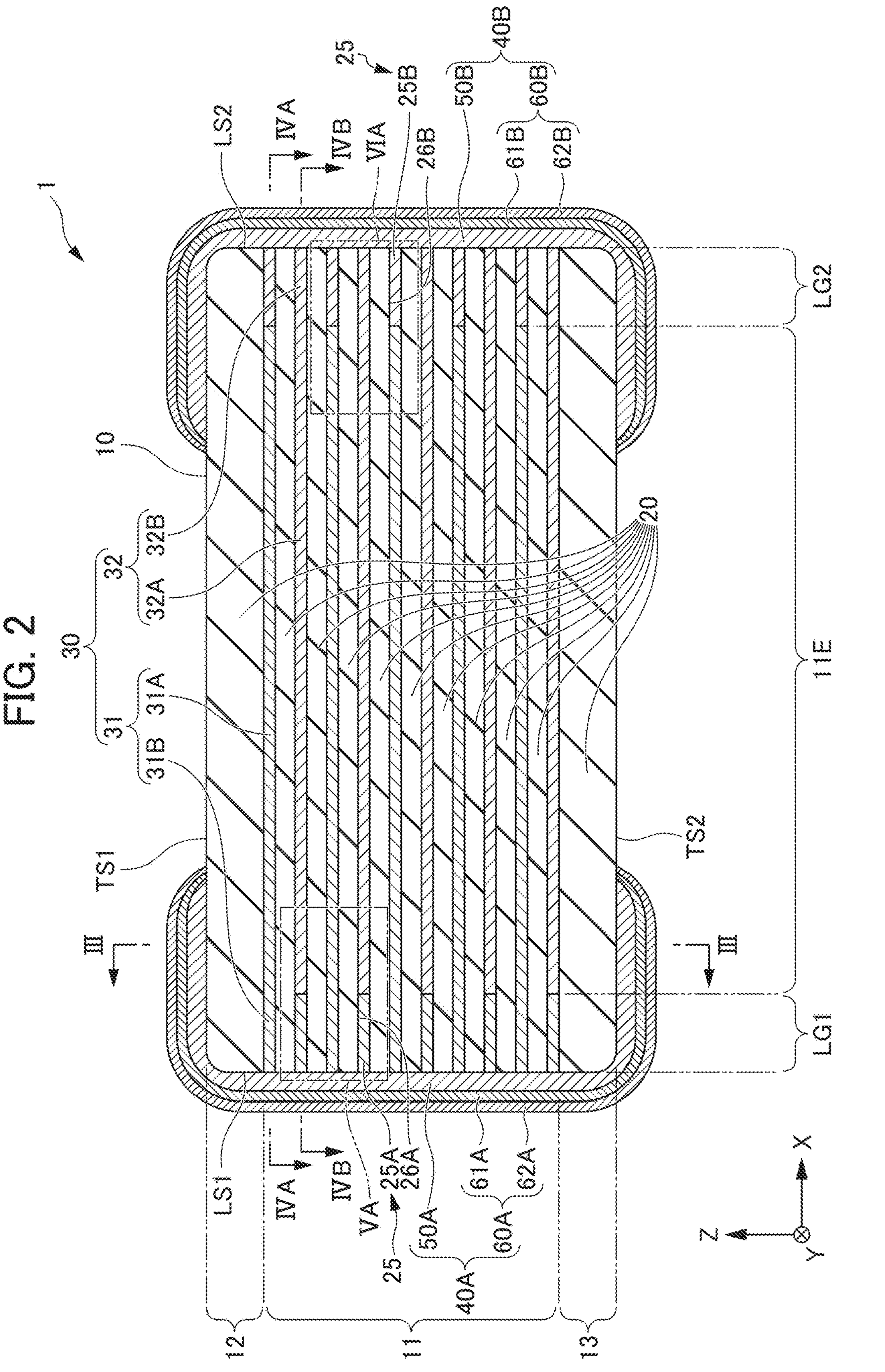
FIG. 2 is a cross-sectional view taken along line II-II illustrated in FIG. 1.
Figure 3:
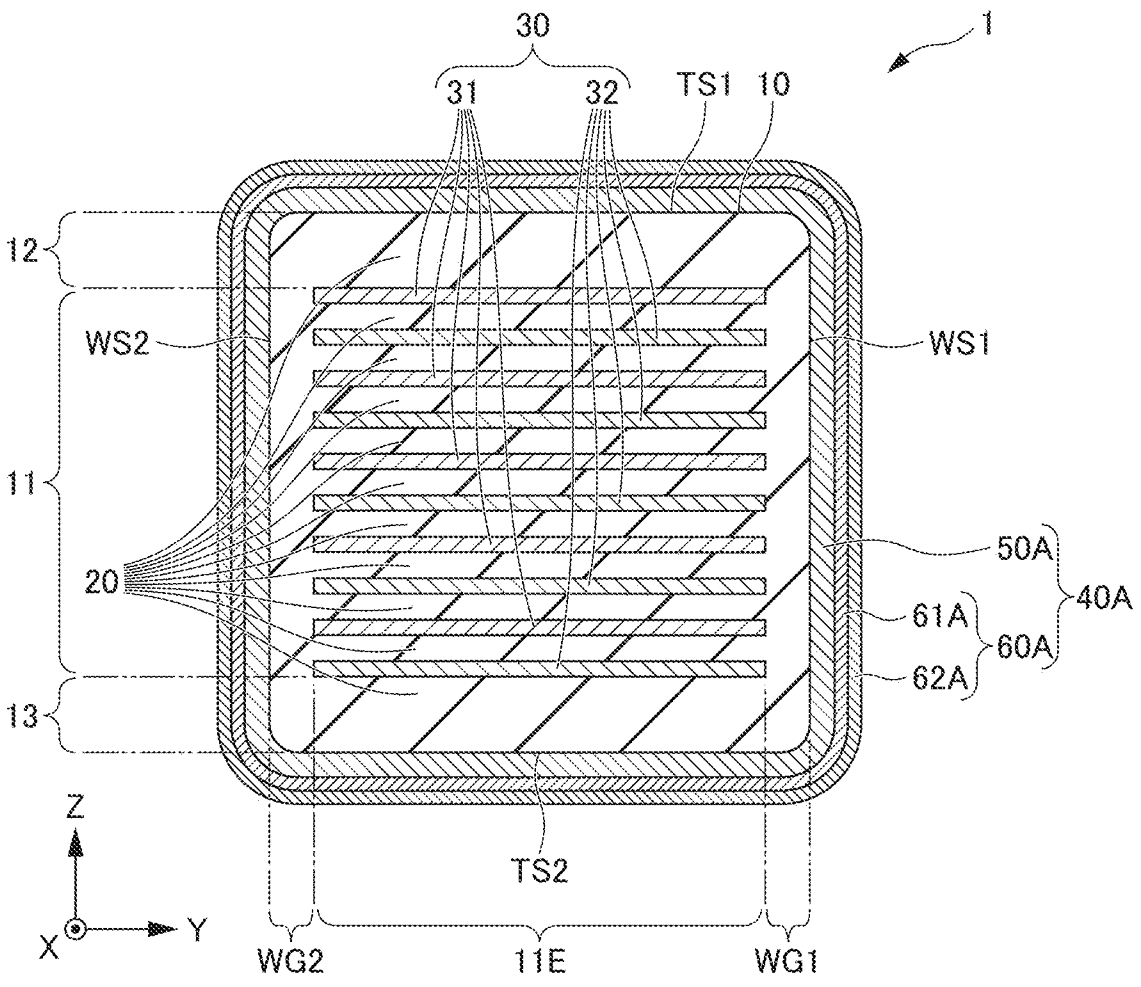
FIG. 3 is a cross-sectional view taken along line III-III illustrated in FIG. 2.
Figure 4A:
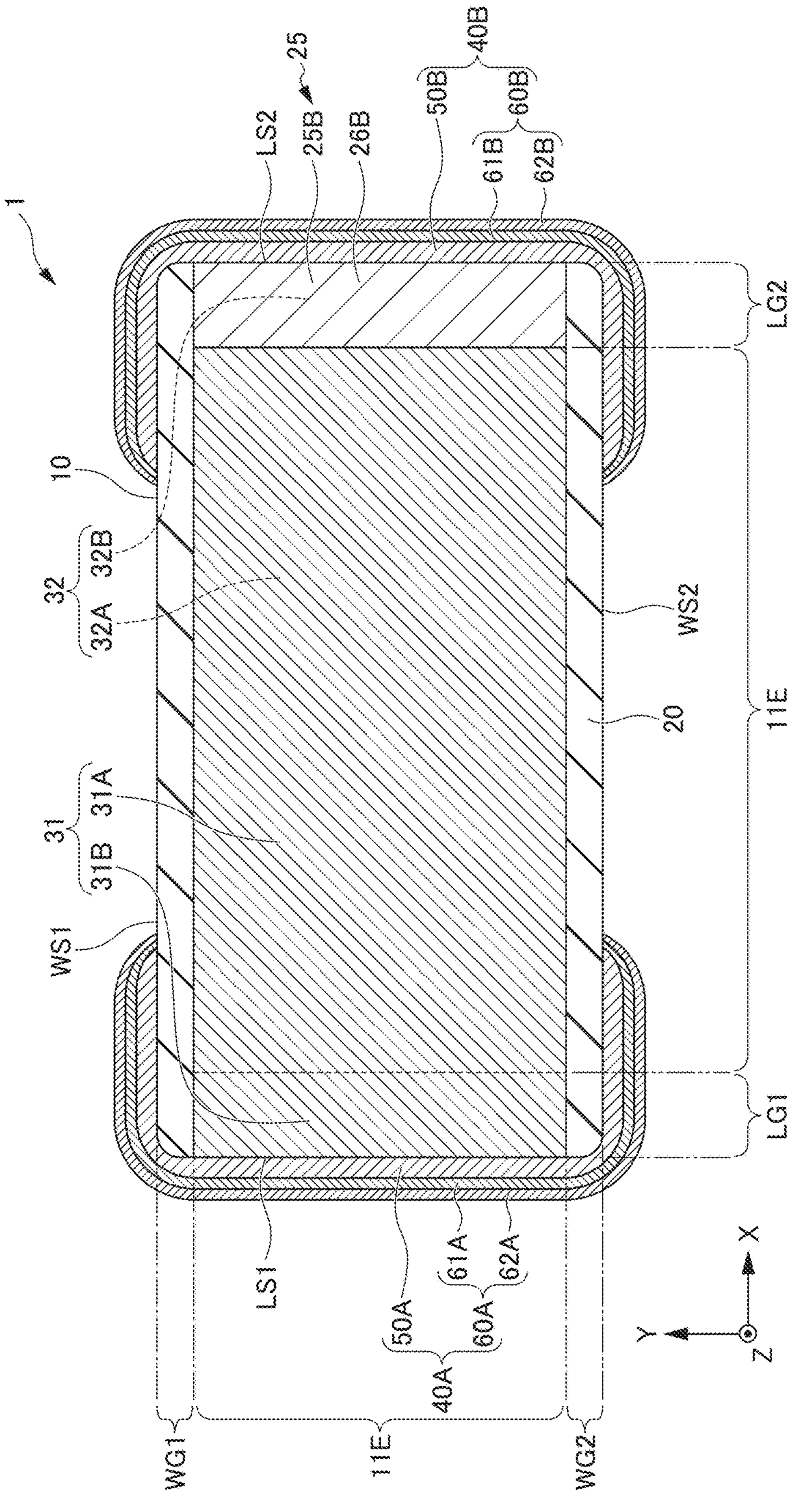
FIG. 4A is a cross-sectional view taken along line IVA-IVA illustrated in FIG. 2.
Figure 4B:
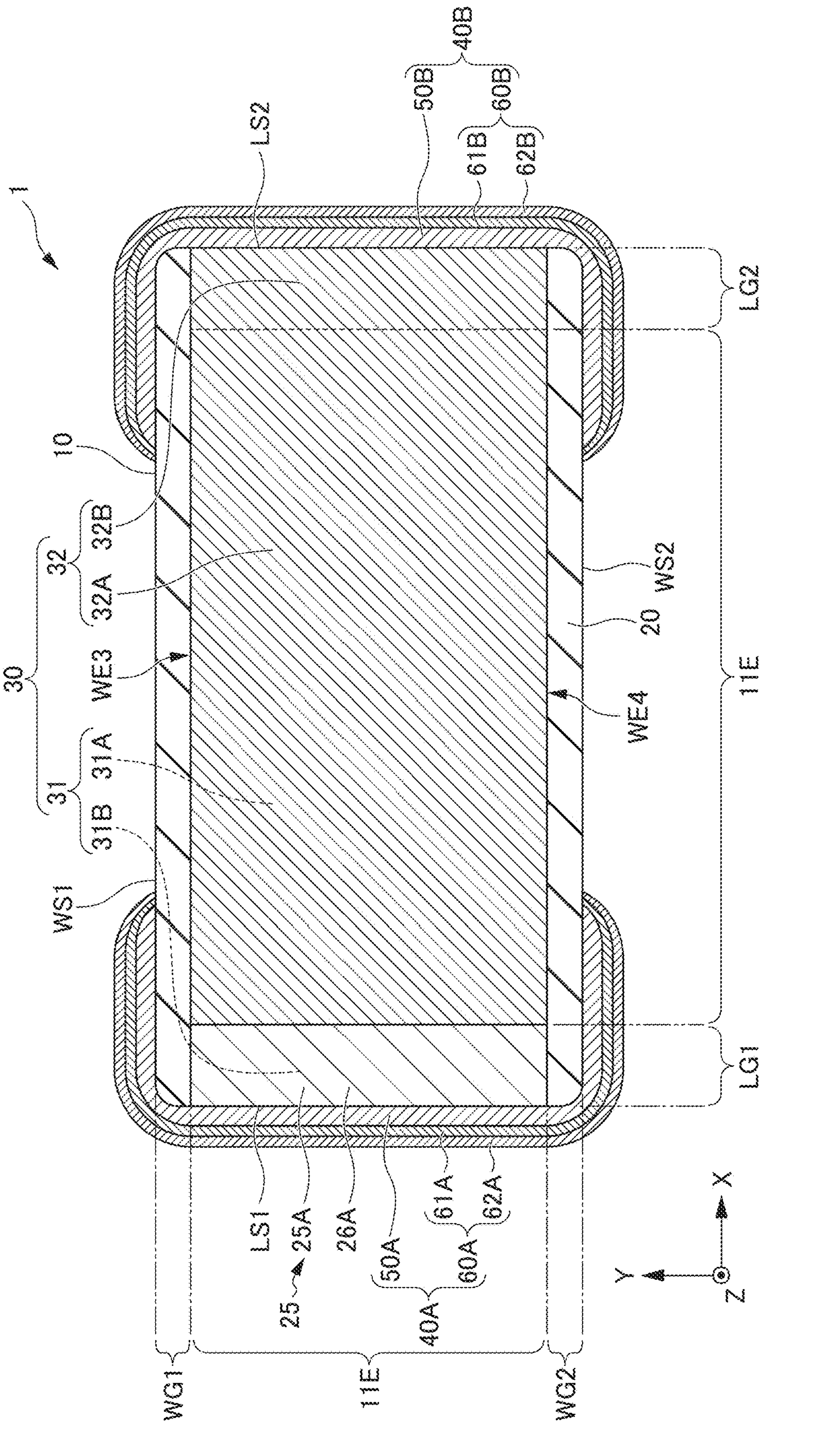
FIG. 4B is a cross-sectional view taken along line IVB-IVB illustrated in FIG. 2.

A multilayer ceramic capacitor 1 defining and functioning as a multilayer ceramic electronic component according to an example embodiment of the present invention will now be described herein with reference to the accompanying drawings. FIG. 1 is a perspective appearance view of the multilayer ceramic capacitor 1 according to the present example embodiment. FIG. 2 is a cross-sectional view taken along line II-II illustrated in FIG. 1. FIG. 3 is a cross-sectional view taken along line III-III illustrated in FIG. 2. FIG. 4A is a cross-sectional view taken along line IVA-IVA illustrated in FIG. 2. FIG. 4B is a cross-sectional view taken along line IVB-IVB illustrated in FIG. 2.

As illustrated in FIG. 1, the multilayer ceramic capacitor 1 according to the present example embodiment has a rectangular or substantially rectangular parallelepiped shape. The multilayer ceramic capacitor 1 includes a multilayer body 10 having a rectangular or substantially rectangular parallelepiped shape and a pair of external electrodes 40 that are disposed at both ends of the multilayer body 10, respectively, and that are thus separated away from each other.

Multilayer Body

In FIG. 1, arrows T indicate lamination directions T of the multilayer ceramic capacitor 1 and the multilayer body 10. The lamination directions T are also thickness directions and height directions of the multilayer ceramic capacitor 1 and the multilayer body 10. In FIG. 1, arrows W indicate width directions W of the multilayer ceramic capacitor 1 and the multilayer body 10, which are orthogonal or substantially orthogonal to the lamination directions T. In FIG. 1, arrows L indicate length directions L of the multilayer ceramic capacitor 1 and the multilayer body 10, which are orthogonal or substantially orthogonal to the lamination directions T and the width directions W. The pair of external electrodes 40 are disposed at the end and the other end, in the length directions L, of the multilayer body 10.

FIGS. 1 to 4B are illustrated with an XYZ orthogonal coordinate system. The length directions L of the multilayer ceramic capacitor 1 and the multilayer body 10 correspond to an X direction. The width directions W of the multilayer ceramic capacitor 1 and the multilayer body 10 correspond to a Y direction. The lamination directions T of the multilayer ceramic capacitor 1 and the multilayer body 10 correspond to a Z direction. Note herein that the cross section illustrated in FIG. 2 is also referred to as an LT cross section. The cross section illustrated in FIG. 3 is also referred to as a WT cross section. The cross sections illustrated in FIGS. 4A and 4B are also referred to as LW cross sections.

As illustrated in FIGS. 1 to 4B, the multilayer body 10 includes a first main surface TS1 and a second main surface TS2 facing each other in the lamination directions T, a first side surface WS1 and a second side surface WS2 facing each other in the width directions W orthogonal or substantially orthogonal to the lamination directions T, and a first end surface LS1 and a second end surface LS2 facing each other in the length directions L orthogonal or substantially orthogonal to the lamination directions T and the width directions W.

As illustrated in FIG. 1, the multilayer body 10 has a rectangular or substantially rectangular parallelepiped shape. It is not limited that a dimension, in the length directions L, of the multilayer body 10 is necessarily longer than a dimension in the width directions W. It is preferable that corner portions and ridge portions of the multilayer body 10 are rounded. The corner portions are portions at which three surfaces of the multilayer body join each other, and the ridge portions are portions at which two surfaces of the multilayer body join each other. The surfaces of the multilayer body 10 may be partially or wholly uneven, for example.

Although the dimensions of the multilayer body 10 are not particularly limited, it is preferable that, when the dimension, in the length directions L, of the multilayer body 10 is referred to as an L dimension, the L dimension is, for example, equal to or longer than about 0.2 mm and equal to or shorter than about 6 mm. Furthermore, it is preferable that, when a dimension, in the lamination directions T, of the multilayer body 10 is referred to as a T dimension, the T dimension is, for example, equal to or longer than about 0.05 mm and equal to or shorter than about 5 mm. Furthermore, it is preferable that, when a dimension, in the width directions W, of the multilayer body 10 is referred to as a W dimension, the W dimension is, for example, equal to or longer than about 0.1 mm and equal to or shorter than about 5 mm.

As illustrated in FIGS. 2 and 3, the multilayer body 10 includes an effective layer portion 11 and a first main surface side outer layer portion 12 and a second main surface side outer layer portion 13 disposed to sandwich the effective layer portion 11 in the lamination directions T.

The effective layer portion 11 includes a plurality of dielectric layers 20 defining and functioning as a plurality of ceramic layers, a plurality of internal electrode layers 30, and a plurality of step layers 25, which are alternately laminated in the lamination directions T. The effective layer portion 11 includes the layers described above ranging, in the lamination directions T, from the internal electrode layer 30 positioned on a side closest to the first main surface TS1 to the internal electrode layer 30 positioned on a side closest to the second main surface TS2. In the effective layer portion 11, the plurality of internal electrode layers 30 are disposed to face each other via the dielectric layers 20, respectively. The effective layer portion 11 is a portion that generates electrostatic capacitance to substantially define and function as a capacitor.

Dielectric Layers

The plurality of dielectric layers 20 include a dielectric material. As the dielectric material, for example, it is possible to use a dielectric ceramic having a main component such as $BaTiO_3$, $CaTiO_3$, $SrTiO_3$, or $CaZrO_3$. Furthermore, in the dielectric material, such a main component as described above may be added with a subcomponent such as, for example, a Mn chemical compound, a Fe chemical compound, a Cr chemical compound, a Co chemical compound, or a Ni chemical compound. The dielectric material may include, as a main component, a plurality of crystal particles including, for example, a perovskite chemical compound that uses $BaTiO_3$ as a basic structure.

It is preferable that a thickness of each of the dielectric layers 20 is reduced, which increases its capacitance when defining and functioning as a capacitor. Although internal crystal particles become smaller as the thickness of each of the dielectric layers 20 becomes thinner, excessively small crystal particles lead to lowered relative permittivity due to a size effect. Therefore, a dimension of each of the crystal particles is appropriately designed in accordance with the thickness of each of the dielectric layers 20. For example, it is preferable that a diameter of each of the crystal particles in the dielectric layers 20 is equal to or smaller than about 1 μm.

It is preferable that the thickness of each of the dielectric layers 20 is, for example, equal to or thinner than about 10 μm. It is preferable that a number of the dielectric layers 20 to be laminated is, for example, equal to or greater than 10 and equal to or smaller than 2000. The number of the dielectric layers 20 is a total of the number of the dielectric layers 20 in the effective layer portion 11 and the numbers of the dielectric layers 20 in both the first main surface side outer layer portion 12 and the second main surface side outer layer portion 13.

As illustrated in FIGS. 2 and 3, the first main surface side outer layer portion 12 is positioned on the side of the first main surface TS1 of the multilayer body 10. The first main surface side outer layer portion 12 is an assembly including the plurality of dielectric layers 20 positioned between the first main surface TS1 and the internal electrode layer 30 that is closest to the first main surface TS1. On the other hand, the second main surface side outer layer portion 13 is positioned on the side of the second main surface TS2 of the multilayer body 10. The second main surface side outer layer portion 13 is an assembly including the plurality of dielectric layers 20 positioned between the second main surface TS2 and the internal electrode layer 30 that is closest to the second main surface TS2. A region sandwiched between the first main surface side outer layer portion 12 and the second main surface side outer layer portion 13 is the effective layer portion 11. The dielectric layers 20 used in the first main surface side outer layer portion 12 and the second main surface side outer layer portion 13 and the dielectric layers 20 used in the effective layer portion 11 may be the same each other.

Internal Electrode Layers

The plurality of internal electrode layers 30 include a plurality of first internal electrode layers 31 and a plurality of second internal electrode layers 32. The first internal electrode layers 31 and the second internal electrode layers 32 are alternately disposed in the lamination directions T to sandwich the dielectric layers 20, respectively. The first internal electrode layers 31 extend to the first end surface LS1. The second internal electrode layers 32 extend to the second end surface LS2. When it is not necessary to describe the first internal electrode layers 31 and the second internal electrode layers 32 in a differentiated manner, the first internal electrode layers 31 and the second internal electrode layers 32 may be hereinafter collectively referred to as the internal electrode layers 30.

As illustrated in FIG. 4A, the first internal electrode layers 31 each include a first counter portion 31A and a first extension portion 31B. The first counter portion 31A is a region facing the second internal electrode layer 32 to sandwich the dielectric layer 20, and is positioned inside the multilayer body 10. The first extension portion 31B is a portion extended from the first counter portion 31A to the first end surface LS1, and is exposed at the first end surface LS1.

As illustrated in FIG. 4B, the second internal electrode layers 32 each include a second counter portion 32A and a second extension portion 32B. The second counter portion 32A is a region facing the first internal electrode layer 31 to sandwich the dielectric layer 20, and is positioned inside the multilayer body 10. The second extension portion 32B is a portion extended from the second counter portion 32A to the second end surface LS2, and is exposed at the second end surface LS2.

In the present example embodiment, the first counter portions 31A and the second counter portions 32A facing each other via the dielectric layers 20, respectively, generate a capacitance, allowing characteristics of a capacitor to be obtained.

Although the first counter portions 31A and the second counter portions 32A are not particularly limited in shape, it is preferable that the shape is a rectangular or substantially rectangular shape. Corner portions of the rectangular or substantially rectangular shape may be rounded, or the corner portions of the rectangular or substantially rectangular shape may be inclined. Although the first extension portions 31B and the second extension portions 32B are not particularly limited in shape, it is preferable that the shape is a rectangular or substantially rectangular shape. Corner portions of the rectangular or substantially rectangular shape may be rounded, or the corner portions of the rectangular or substantially rectangular shape may be inclined.

A dimension, in the width directions W, of the first counter portion 31A and a dimension, in the width directions W, of the first extension portion 31B may be the same dimensions, or one of the dimensions may be smaller. A dimension, in the width directions W, of the second counter portion 32A and a dimension, in the width directions W, of the second extension portion 32B may have the same dimensions, or one of the dimensions may be smaller.

Both circumferential ends, in the width directions W, of the first extension portion 31B may extend in a curved manner toward a center, in the width directions W, of the first end surface LS1 of the multilayer body 10. Circumferential ends, in the width directions W, of the second extension portion 32B may extend in a curved manner toward a center, in the width directions W, of the second end surface LS2 of the multilayer body 10. Among end surfaces (exposed surfaces) of the plurality of first extension portions 31B, which extend to the first end surface LS1, a distance in the lamination directions T between the end surface on the side closest to the first main surface TS1 and the end surface on the side closest to the second main surface TS2 may be shorter than a distance in the lamination directions T between the first counter portion 31A or the second counter portion 32A on the side closest to the first main surface TS1 and the first counter portion 31A or the second counter portion 32A on the side closest to the second main surface TS2. Among end surfaces (exposed surfaces) of the plurality of second extension portions 32B, which extend to the second end surface LS2, a distance in the lamination directions T between the end surface on the side closest to the first main surface TS1 and the end surface on the side closest to the second main surface TS2 may be shorter than a distance in the lamination directions T between the first counter portion 31A or the second counter portion 32A on the side closest to the first main surface TS1 and the first counter portion 31A or the second counter portion 32A on the side closest to the second main surface TS2.

Although it is possible that the first internal electrode layers 31 and the second internal electrode layers 32 include an appropriate electrically-conductive material such as a metal selected from Ni, Cu, Ag, Pd, and Au or an alloy including at least one type of the metals, for example, the present invention is not limited to the example. When an alloy is used, the first internal electrode layers 31 and the second internal electrode layers 32 may include an Ag—Pd alloy, for example.

It is preferable that a thickness of each of the first internal electrode layers 31 and the second internal electrode layers 32 is equal to or thicker than about 0.2 μm and equal to or thinner than about 2.0 μm, for example. It is preferable that a total number of the first internal electrode layers 31 and the second internal electrode layers 32 is, for example, equal to or greater than 10 and equal to or smaller than 2000.

Since it is necessary to increase an area of each of the internal electrode layers 30 to increase the capacitance of the capacitor, it is preferable that a coverage (a coverage ratio), on the LW cross section, of the internal electrode layer 30 is, for example, equal to or greater than about 90%. The coverage referred herein is defined by a ratio acquired by subtracting an area of gaps or holes that are present in the internal electrode layer 30 from an area of the internal electrode layer 30 on the LW cross section of the internal electrode layer 30. Although the higher the coverage on the LW cross section of the internal electrode layer 30, the higher the capacitance of the capacitor, the dielectric layers 20 are joined to each other via the gaps even if the coverage is low, interlayer joining strength is increased, and interlayer peeling off rarely occurs. Although it is preferable that thicknesses of the internal electrode layers 30 is uniform, a thickness at an edge portion in the width directions W may be thicker than a thickness at a center portion in the width directions W.

Step Layers

The plurality of step layers 25 include a plurality of first step layers 25A and a plurality of second step layers 25B. As illustrated in FIG. 2, each of the plurality of first step layers 25A is disposed in a first step region 26A to fill the first step region 26A defining and functioning as a space where the second internal electrode layer 32 is not disposed, between a pair of the dielectric layers 20 facing each other in the lamination directions T via the second internal electrode layer 32. Each of the plurality of first step layers 25A is superimposed in the lamination directions T with the pair of dielectric layers 20 on both sides in the lamination directions T. Each of the plurality of first step layers 25A is disposed at a position the same as a position of the second internal electrode layer 32 in the lamination directions T, and is joined to an end, on a side closer to the first end surface LS1, of the second counter portion 32A of the second internal electrode layer 32. Each of the plurality of first step layers 25A is exposed at the first end surface LS1.

Each of the plurality of second step layers 25B is disposed in a second step region 26B to fill the second step region 26B defining and functioning as a space where the first internal electrode layer 31 is not disposed, between a pair of dielectric layers 20 facing each other in the lamination directions T via the first internal electrode layer 31. Each of the plurality of second step layers 25B is superimposed in the lamination directions T with the pair of dielectric layers 20 on both sides in the lamination directions T. Each of the plurality of second step layers 25B is disposed at a position the same as a position of the first internal electrode layer 31 in the lamination directions T, and is joined to an end, on a side closer to the second end surface LS2, of the first counter portion 31A of the first internal electrode layer 31. Each of the plurality of second step layers 25B is exposed at the second end surface LS2.

The first step layers 25A and the second step layers 25B may each include a ceramic based dielectric material the same as a ceramic based dielectric material of the dielectric layers 20. The first step layers 25A and the second step layers 25B may each include a material different from a material of the dielectric layers 20. The first step layers 25A and the second step layers 25B have characteristic aspects according to various example embodiments of the present disclosure, and the aspects will be described later in detail. When it is not necessary to describe the first step layers 25A and the second step layers 25B in a differentiated manner, the first step layers 25A and the second step layers 25B may be hereinafter collectively referred to as the step layers 25. It is preferable that the step layers 25 each have a thickness that is the same or substantially the same as the thickness of each of the internal electrode layers 30, which lie at the same or substantially the same position in the lamination directions T.

As illustrated in FIGS. 2 to 4B, the multilayer body 10 includes a counter electrode portion 11E. The counter electrode portion 11E is a portion in which the first counter portions 31A of the first internal electrode layers 31 and the second counter portions 32A of the second internal electrode layers 32 face each other. The counter electrode portion 11E is a portion of the effective layer portion 11. FIGS. 4A and 4B illustrate ranges, in the width directions W and the length directions L, of the counter electrode portion 11E. The counter electrode portion 11E is also referred to as an effective capacitor portion.

The multilayer body 10 includes side surface side outer layer portions. The side surface side outer layer portions include, as illustrated in FIGS. 3 to 4B, a first side surface side outer layer portion WG1 and a second side surface side outer layer portion WG2. The first side surface side outer layer portion WG1 is a portion including the dielectric layer 20 positioned between the effective layer portion 11, the first main surface side outer layer portion 12, and the second main surface side outer layer portion 13 and the first side surface WS1. The second side surface side outer layer portion WG2 is a portion including the dielectric layer 20 positioned between the effective layer portion 11, the first main surface side outer layer portion 12, and the second main surface side outer layer portion 13 and the second side surface WS2.

FIGS. 3 to 4B illustrate ranges, in the width directions W, of the first side surface side outer layer portion WG1 and the second side surface side outer layer portion WG2. The side surface side outer layer portions are also referred to as W gaps or side gaps.

The first side surface WS1 and the second side surface WS2 of the multilayer body 10 may include insulating layers, respectively. In that case, interfaces between the dielectric layers 20 and the internal electrode layers 30 are covered by the insulating layers, making it possible to reduce or prevent infiltration of moisture. It is preferable that the insulating layers include, but not limited to, a material similar or identical to a material of the dielectric layers 20. Such insulating layers as described above may be disposed to be joined to the internal electrode layers 30.

The multilayer body 10 includes end surface side outer layer portions. The end surface side outer layer portions include, as illustrated in FIGS. 2, 4A, and 4B, a first end surface side outer layer portion LG1 and a second end surface side outer layer portion LG2.

The first end surface side outer layer portion LG1 is a portion positioned between the counter electrode portion 11E and the first end surface LS1, and includes the plurality of dielectric layers 20, the plurality of first extension portion 31B, and the plurality of first step layers 25A. That is, the first end surface side outer layer portion LG1 is an assembly of portions, on the side of the first end surface LS1, of the plurality of dielectric layers 20, the plurality of first extension portion 31B, and the plurality of first step layers 25A.

The second end surface side outer layer portion LG2 is a portion positioned between the counter electrode portion 11E and the second end surface LS2, and includes the plurality of dielectric layers 20, the plurality of second extension portion 32B, and the plurality of second step layers 25B. That is, the second end surface side outer layer portion LG2 is an assembly of portions, on the side of the second end surface LS2, of the plurality of dielectric layers 20, the plurality of second extension portion 32B, and the plurality of second step layers 25B.

FIGS. 2, 4A, and 4B illustrate ranges, in the length directions L, of the first end surface side outer layer portion LG1 and the second end surface side outer layer portion LG2. The end surface side outer layer portions are also referred to as L gaps or end gaps. The first step layers 25A and the second step layers 25B described above are disposed in the L gaps.

External Electrodes

The external electrodes 40 include, as illustrated in FIGS. 1 and 2, a first external electrode 40A disposed on the side of the first end surface LS1 of the multilayer body 10 and a second external electrode 40B disposed on the side of the second end surface LS2 of the multilayer body 10.

Basic configurations of the first external electrode 40A and the second external electrode 40B are the same or substantially the same as each other. Furthermore, the first external electrode 40A and the second external electrode 40B have shapes that are substantially plane-symmetrical to each other with respect to the WT cross section at a center, in the length directions L, of the multilayer ceramic capacitor 1. Therefore, when it is not necessary to describe the first external electrode 40A and the second external electrode 40B in a differentiated manner, the first external electrode 40A and the second external electrode 40B may be hereinafter collectively referred to as the external electrodes 40.

The first external electrode 40A is disposed on the first end surface LS1. The first external electrode 40A is in contact with the first extension portions 31B of the plurality of first internal electrode layers 31, respectively, which are exposed at the first end surface LS1. Thus, the first external electrode 40A is electrically coupled to the plurality of first internal electrode layers 31. It is preferable that the first external electrode 40A according to the present example embodiment is further disposed on a portion of the first main surface TS1 and a portion of the second main surface TS2 and a portion of the first side surface WS1 and a portion of the second side surface WS2. That is, it is preferable that the first external electrode 40A is provided to partially cover the first main surface TS1, the second main surface TS2, the first side surface WS1, and the second side surface WS2 from the first end surface LS1.

The second external electrode 40B is disposed on the second end surface LS2. The second external electrode 40B is in contact with the second extension portions 32B of the plurality of second internal electrode layers 32, respectively, which are exposed at the second end surface LS2. Thus, the second external electrode 40B is electrically coupled to the plurality of second internal electrode layers 32. It is preferable that the second external electrode 40B according to the present example embodiment is further provided on a portion of the first main surface TS1 and a portion of the second main surface TS2 and a portion of the first side surface WS1 and a portion of the second side surface WS2. That is, it is preferable that the second external electrode 40B is provided to partially cover the first main surface TS1, the second main surface TS2, the first side surface WS1, and the second side surface WS2 from the second end surface LS2.

As described above, in the multilayer body 10, the first counter portions 31A of the first internal electrode layers 31 and the second counter portions 32A of the second internal electrode layers 32 face each other via the dielectric layers 20, respectively, generating capacitance. Therefore, the characteristics of a capacitor appear between the first external electrode 40A to which the first internal electrode layers 31 are coupled and the second external electrode 40B to which the second internal electrode layers 32 are coupled.

As illustrated in FIGS. 2, 4A, and 4B, the first external electrode 40A includes a first base electrode layer 50A and a first plated layer 60A disposed on the first base electrode layer 50A. Furthermore, the second external electrode 40B includes a second base electrode layer 50B and a second plated layer 60B disposed on the second base electrode layer 50B.

The first base electrode layer 50A is disposed on the first end surface LS1. The first base electrode layer 50A is coupled to the first extension portions 31B of the plurality of first internal electrode layers 31, respectively, which are exposed at the first end surface LS1. In the present example embodiment, the first base electrode layer 50A extends from the first end surface LS1 to a portion of the first main surface TS1 and a portion of the second main surface TS2 and a portion of the first side surface WS1 and a portion of the second side surface WS2.

The second base electrode layer 50B is disposed on the second end surface LS2. The second base electrode layer 50B is in contact with the second extension portions 32B of the plurality of second internal electrode layers 32, respectively, which are exposed at the second end surface LS2. In the present example embodiment, the second base electrode layer 50B extends from the second end surface LS2 to a portion of the first main surface TS1 and a portion of the second main surface TS2 and a portion of the first side surface WS1 and a portion of the second side surface WS2.

The first base electrode layer 50A and the second base electrode layer 50B according to the present example embodiment each include at least one of a fired layer, an electrically-conductive resin layer, or a thin film layer, for example.

When the first base electrode layer 50A and the second base electrode layer 50B are fired layers, it is preferable that the fired layers each include a glass component and a metal component. The glass component includes at least one of B, Si, Ba, Mg, Al, or Li, for example. The metal component includes at least one of Cu, Ni, Ag, Pd, Ag—Pd alloy, or Au, for example.

The fired layers are, for example, ones acquired by firing the multilayer body 10 applied with an electrically-conductive paste including glass and a metal. It is possible to form the fired layers by simultaneously firing (cofiring) a multilayer chip before undergoing firing, which is a raw material of the multilayer body 10 including the pluralities of internal electrodes and dielectric layers, and an electrically-conductive paste applied to the multilayer chip. Otherwise, the fired layers may be formed, after acquiring the multilayer body 10 by firing (post-firing) the multilayer chip, by firing the multilayer body 10 applied with an electrically-conductive paste. The fired layers may each include a plurality of layers.

It is preferable that a thickness, corresponding to the length directions L, of each of the first base electrode layer 50A and the second base electrode layer 50B formed based on fired layers, respectively, is equal to or thicker than about 0.1 μm and equal to or thinner than about 200 μm at a center portion in the lamination directions T, for example. Furthermore, it is preferable that a thickness corresponding to the lamination directions T, when the first base electrode layer 50A and the second base electrode layer 50B formed based on fired layers, respectively, are provided to portions of the first main surface TS1 and the second main surface TS2, respectively, is equal to or thicker than about 0.1 μm and equal to or thinner than about 200 μm at a center portion in the length directions L, for example. Furthermore, it is preferable that a thickness corresponding to the width directions W, when the first base electrode layer 50A and the second base electrode layer 50B formed based on fired layers, respectively, are provided to portions of the first side surface WS1 and the second side surface WS2, respectively, is equal to or thicker than about 0.1 μm and equal to or thinner than about 200 μm at a center portion in the length directions L, for example.

When the first base electrode layer 50A and the second base electrode layer 50B are electrically-conductive resin layers, the electrically-conductive resin layers may include, for example, a thermosetting resin and a metal.

The electrically-conductive resin layers including a thermosetting resin offer enough flexibility, compared with electrically-conductive layers that include plating films, respectively, or that are acquired by firing an electrically-conductive paste, for example. Therefore, the electrically-conductive resin layers define and function as shock-absorbing layers even when the multilayer ceramic capacitor 1 receives a physical shock or a shock due to heat cycles. Thus, the electrically-conductive resin layers reduce or prevent the occurrence of a crack on the multilayer ceramic capacitor 1.

As a metal included in the electrically-conductive resin layers, it is possible to use Ag or Cu or its alloy, for example. Furthermore, for example, it is possible to use a metal having undergone Ag coating on a surface of a metallic powder. When using a metal having undergone Ag coating on a surface of a metallic powder, for example, it is preferable to use Cu or Ni as the metallic powder. Furthermore, it is possible to use one acquired by allowing Cu to undergo an oxidation prevention treatment. Reasons of using an electrically-conductive metallic powder of Ag as an electrically-conductive metal are that Ag presents lowest specific resistance among metals and is appropriate as an electrode material and Ag is a noble metal that is immune to oxidation with high resistivity. Reasons to use a metal having undergone Ag coating are to make it possible to keep the characteristics of Ag described above and to lower a cost of a metal serving as a base material.

It is preferable that a metal included in the electrically-conductive resin layers is provided, for example, at a ratio equal to or higher than about 35 vol % and equal to or less than about 75 vol % with respect to a volume of the entire electrically-conductive resin. A shape of a metal included in the electrically-conductive resin layers is not particularly limited. An average particle diameter of a metal included in the electrically-conductive resin layers is not particularly limited. An approximate average particle diameter of a metallic powder included in the electrically-conductive resin layers may be equal to or greater than about 0.3 μm and equal to or smaller than about 10 μm, for example. A metal included in the electrically-conductive resin layers mainly provides electrical conductivity of the electrically-conductive resin layers. Specifically, as electrically-conductive fillers that are metallic powders come into contact with each other, an electrically-conductive path is provided in each of the electrically-conductive resin layers. Although it is possible to use the electrically-conductive resin layers including spherical metallic powders or flat metallic powders, for example, it is preferable to use a mixture of spherical metallic powders and flat metallic powders.

As a resin for the electrically-conductive resin layers, it is possible to use one of various types of known thermosetting resins including epoxy resins, phenol resins, urethane resins, silicone resins, and polyimide resins, for example. Among them, an epoxy resin is one most appropriate resin that is superior in heat resistance, moisture resistance, and adhesiveness, for example. It is preferable that a resin included in the electrically-conductive resin layers is provided, for example, at a ratio equal to or higher than about 25 vol % and equal to or less than about 65 vol % with respect to a volume of a whole electrically-conductive resin. Furthermore, it is preferable that the electrically-conductive resin layers includes a hardening agent together with a thermosetting resin. When an epoxy resin is used as a base resin, it is possible to use, as the hardening agent, various types of known chemical compounds including phenol-based, amine-based, acid anhydride-based, and imidazole-based chemical compounds, for example.

The electrically-conductive resin layers may each include a plurality of layers. The electrically-conductive resin layers are disposed to cover the fired layers, respectively. The electrically-conductive resin layers may be directly disposed on the multilayer body. When the electrically-conductive resin layers are disposed to cover the fired layers, the electrically-conductive resin layers are disposed between the fired layers and the plated layers (the first plated layer 60A and the second plated layer 60B), respectively.

It is preferable that the thickness, corresponding to the length directions L, of each of the first base electrode layer 50A and the second base electrode layer 50B formed based on electrically-conductive resin layers, respectively, is equal to or thicker than about 10 μm and equal to or thinner than about 200 μm at a center portion in the lamination directions T, for example. Furthermore, it is preferable that the thickness corresponding to the lamination directions T, when the first base electrode layer 50A and the second base electrode layer 50B formed based on electrically-conductive resin layers, respectively, are provided on portions of the first main surface TS1 and the second main surface TS2, respectively, is equal to or thicker than about 5 μm and equal to or thinner than about 50 μm at a center portion in the length directions L, for example. Furthermore, it is preferable that the thickness corresponding to the width directions W, when the first base electrode layer 50A and the second base electrode layer 50B formed based on fired layers, respectively, are provided on portions of the first side surface WS1 and the second side surface WS2, respectively, is equal to or thicker than about 5 μm and equal to or thinner than about 50 μm at a center portion in the length directions L, for example.

When the first base electrode layer 50A and the second base electrode layer 50B are thin film layers, it is possible to form the thin film layers with a thin film forming method such as a sputtering method or an evaporation method, for example. It is preferable that the thin film layers according to the present example embodiment are layers each accumulated with metal particles to have a thickness equal to or thinner than about 1 μm, for example.

The first plated layer 60A in the first external electrode 40A is disposed to cover the first base electrode layer 50A.

The second plated layer 60B in the second external electrode 40B is disposed to cover the second base electrode layer 50B.

It is preferable that the first plated layer 60A and the second plated layer 60B each include at least one of Cu, Ni, Sn, Ag, Pd, an Ag—Pd alloy, or Au, for example. The first plated layer 60A and the second plated layer 60B may each include a plurality of layers. It is preferable that the first plated layer 60A and the second plated layer 60B each have a two-layer structure including an Sn plated layer on an Ni plated layer, for example.

The first plated layer 60A is disposed to cover the first base electrode layer 50A. The first plated layer 60A according to the example embodiment includes a first Ni plated layer 61A and a first Sn plated layer 62A positioned on the first Ni plated layer 61A.

The second plated layer 60B is disposed to cover the second base electrode layer 50B. The second plated layer 60B according to the example embodiment includes a second Ni plated layer 61B and a second Sn plated layer 62B positioned on the second Ni plated layer 61B.

The Ni plated layers prevent, when the multilayer ceramic capacitor 1 is to be mounted, the first base electrode layer 50A and the second base electrode layer 50B from being eroded by solder. Furthermore, the Sn plated layers improve wettability of solder when the multilayer ceramic capacitor 1 is to be mounted. Thus, mounting of the multilayer ceramic capacitor 1 is facilitated. It is preferable that a thickness of each of the first Ni plated layer 61A, the first Sn plated layer 62A, the second Ni plated layer 61B, and the second Sn plated layer 62B is equal to or thicker than about 1 μm and equal to or thinner than about 15 μm, for example.

The external electrodes 40 may include plated layers only, without base electrode layers provided on the first end surface LS1 and the second end surface LS2, respectively. In this case, it is preferable that the plated layers are formed after disposing a catalyst as preliminary processing on surfaces in regions where the plated layers are to be formed.

It is preferable that the plated layers in this case each include a lower layer plating electrode provided on a surface of the multilayer body 10 and an upper layer plating electrode provided on a surface of the lower layer plating electrode. It is preferable that the lower layer plating electrode and the upper layer plating electrode each include at least one type of a metal selected from Cu, Ni, Sn, Pb, Au, Ag, Pd, Bi or Zn, for example, or an alloy including the metal. It is preferable that the lower layer plating electrode is made using Ni having solder barrier capability. It is preferable that the upper layer plating electrode made using Sn or Au having proper solder wettability.

Furthermore, for example, it is preferable that, when the first internal electrode layers 31 and the second internal electrode layers 32 are made using Ni, the lower layer plating electrode is made using Cu to facilitate joining with Ni. It is sufficient that the upper layer plating electrode is provided as necessary, and the external electrodes 40 may include only the lower layer plating electrode.

Furthermore, the plated layers may each include an upper layer plating electrode as an outermost layer, and further include another plating electrode on a surface of the upper layer plating electrode. It is preferable that a thickness per layer of each of the plated layers disposed without providing a base electrode layer is equal to or thicker than about 1 μm and equal to or thinner than about 15 μm, for example. Furthermore, it is preferable that the plated layers do not include glass. It is preferable that a metal ratio per unit volume of each of the plated layers is equal to or higher than about 99% by volume, for example.

A basic configuration of the multilayer ceramic capacitor 1 according to the present example embodiment has been described above. It is preferable that, when a dimension, in the length directions L, of the multilayer ceramic capacitor 1 including the multilayer body 10 and the external electrodes 40 is referred to as an L dimension, the L dimension is equal to or longer than about 0.2 mm and equal to or shorter than about 6.5 mm, for example. Furthermore, it is preferable that, when a dimension, in the lamination directions T, of the multilayer ceramic capacitor 1 is referred to as a T dimension, the T dimension is equal to or longer than about 0.1 mm and equal to or shorter than about 6.5 mm, for example. Furthermore, it is preferable that, when a dimension, in the width directions W, of the multilayer ceramic capacitor 1 is referred to as a W dimension, the W dimension is equal to or longer than about 0.1 mm and equal to or shorter than about 5.5 mm, for example.

Step Layers and Protruded Portions

Next, the step layers 25, and protruded portions with which the first end surface LS1 and the second end surface LS2 are provided, respectively, which are the characteristic aspects according to various example embodiments of the present disclosure, will now be described herein in detail.

Figure 5A:
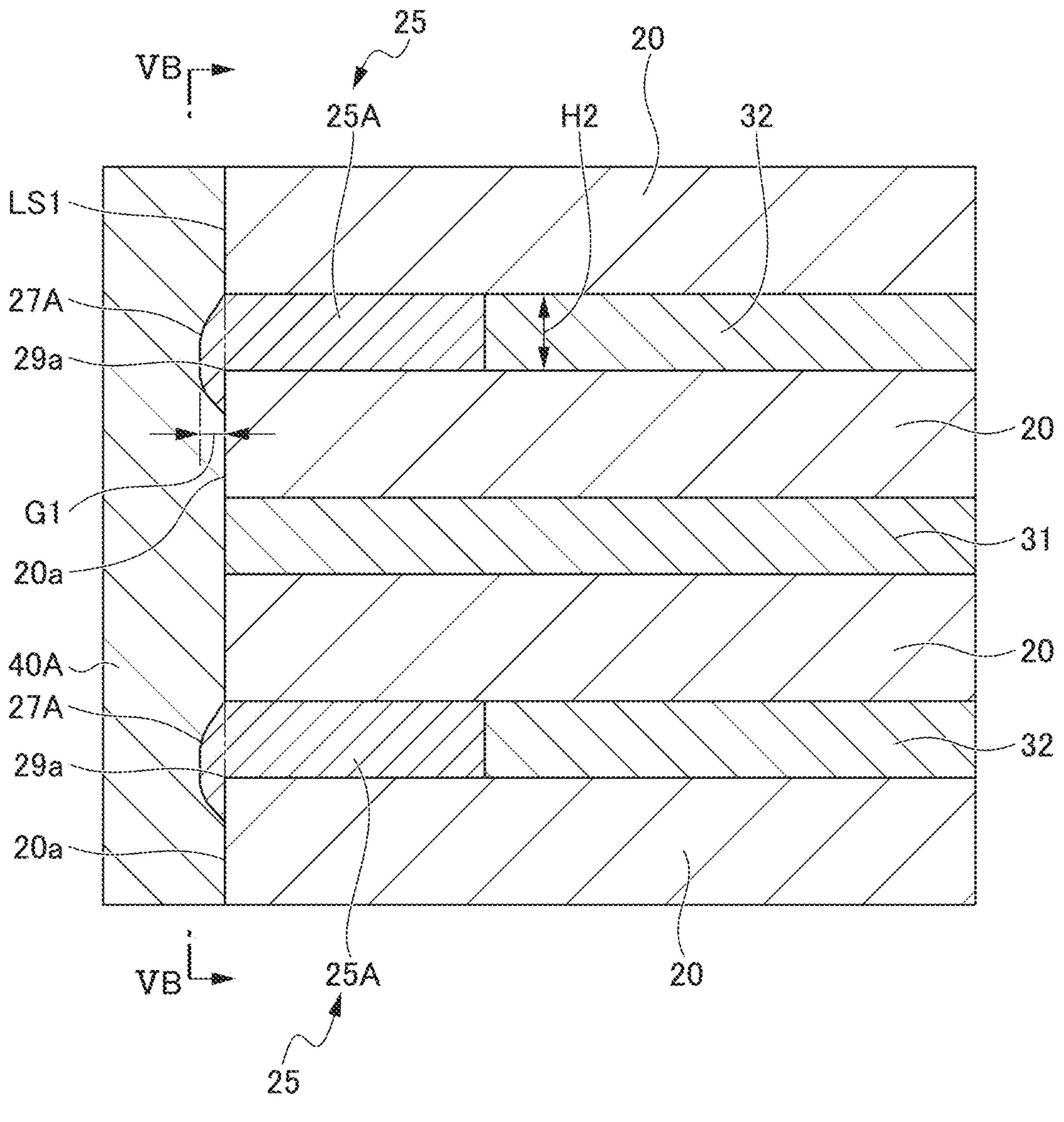
FIG. 5A is a view schematically illustrating, in an enlarged manner, a portion indicated by VA illustrated in FIG. 2.
Figure 5B:
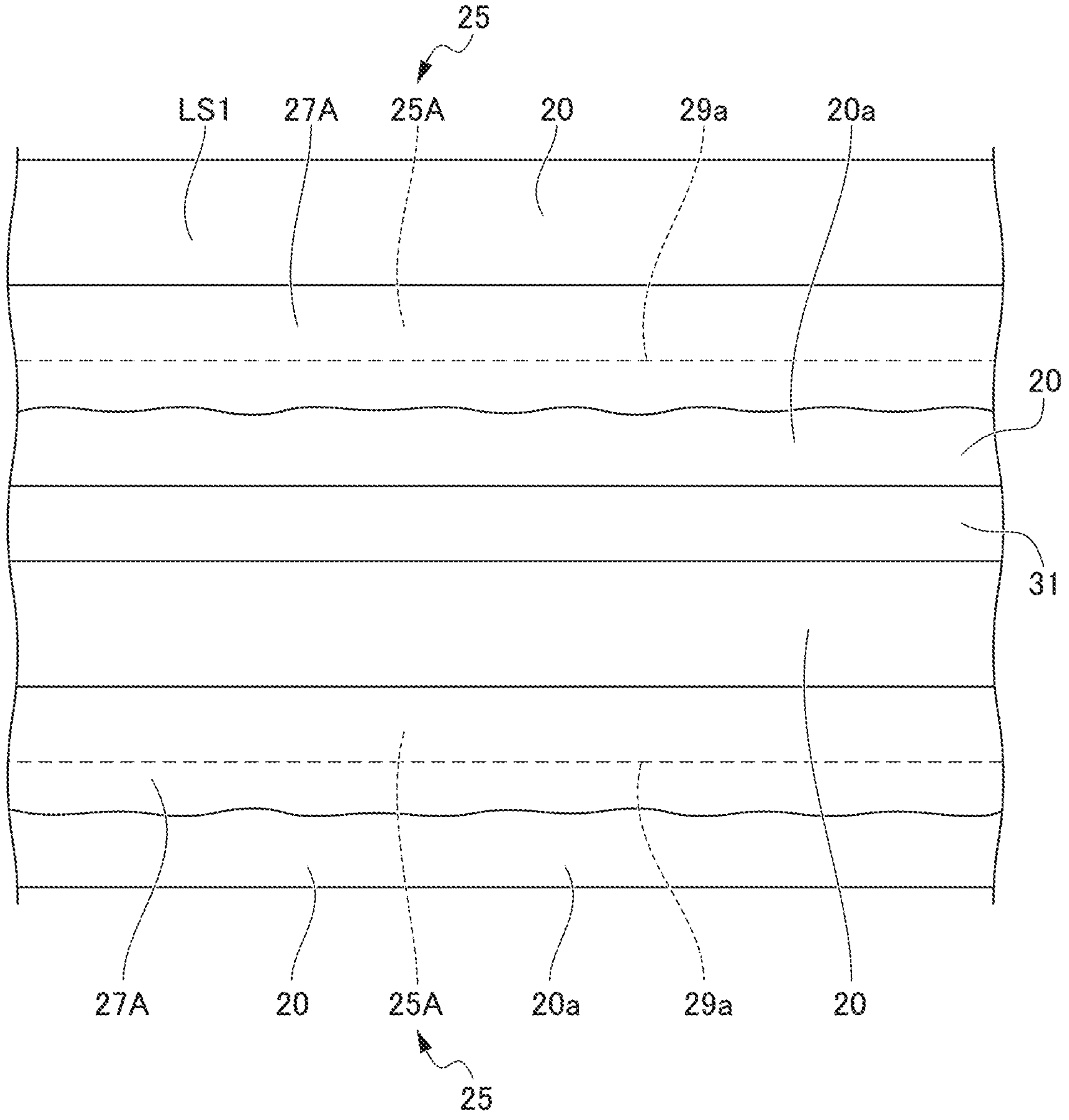
FIG. 5B is a cross-sectional view taken along line VB-VB in a state where a first external electrode 40A is excluded in FIG. 5A.
Figure 6A:
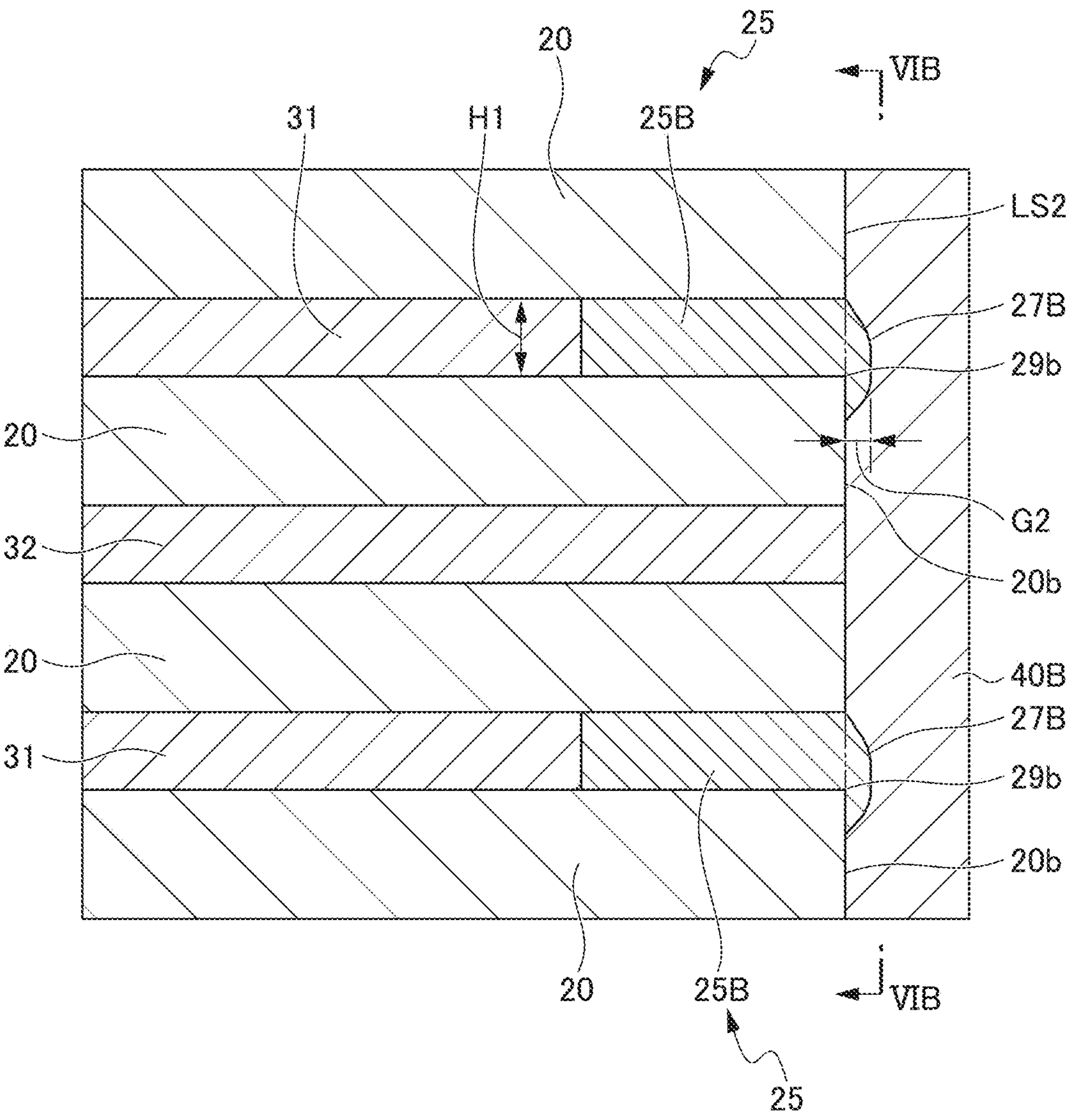
FIG. 6A is a view schematically illustrating, in an enlarged manner, a portion indicated by VIA illustrated in FIG. 2.
Figure 6B:
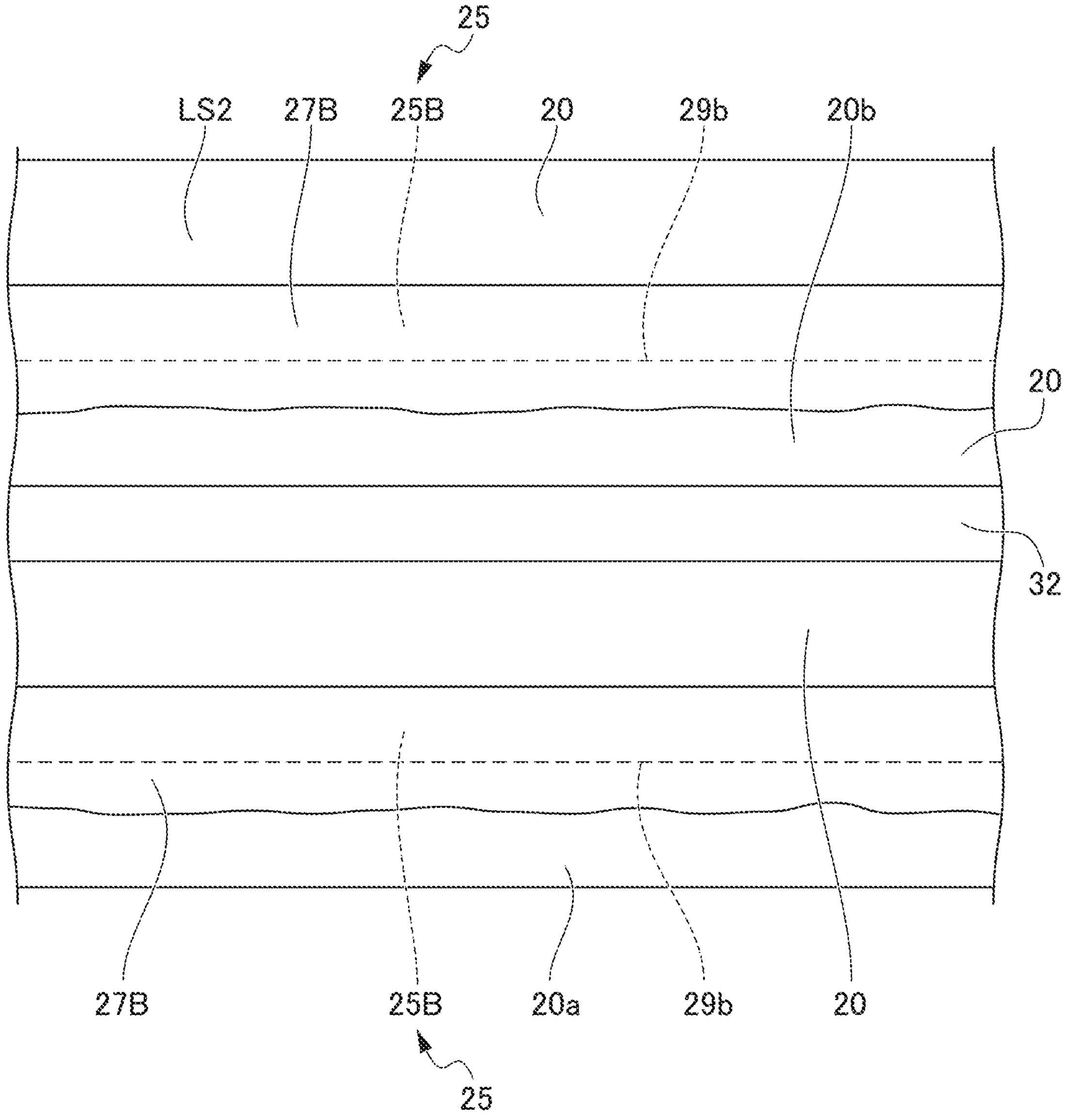
FIG. 6B is a cross-sectional view taken along line VIB-VIB in a state where a second external electrode 40B is excluded in FIG. 6A.

FIG. 5A is a view schematically illustrating, in an enlarged manner, a portion indicated by VA illustrated in FIG. 2. FIG. 5B is a cross-sectional view taken along line VB-VB in a state where the first external electrode 40A is excluded in FIG. 5A. FIG. 6A is a view schematically illustrating, in an enlarged manner, a portion indicated by VIA illustrated in FIG. 2. FIG. 6B is a cross-sectional view taken along line VIB-VIB in a state where the second external electrode 40B is excluded in FIG. 6A.

As illustrated in FIGS. 5A and 5B, the first end surface LS1 includes a plurality of first protruded portions 27A protruding in one of the length directions L. Furthermore, as illustrated in FIGS. 6A and 6B, the second end surface LS2 includes a plurality of second protruded portions 27B protruding in another one of the length directions L.

As illustrated in FIGS. 5A and 5B, the plurality of first protruded portions 27A are each provided in a region including a location corresponding to the first step layer 25A, on the first end surface LS1. The first protruded portion 27A is a portion of a ceramic material of the first step layer 25A protruding from the first step layer 25A in the one of the length directions L of the multilayer body 10. The first protruded portion 27A is partially protruding, from the first step layer 25A, in a region including the dielectric layer 20 adjacent to the first step layer 25A.

The first protruded portion 27A according to the present example embodiment extends downward from the first step layer 25A along an end surface 20*a* of the dielectric layer 20 adjacent to one side in the lamination directions T (a lower side in FIG. 5A) and covers at least a portion of the end surface 20*a*. Therefore, such a state is obtained that, on the first end surface LS1, an interface 29*a* between the first step layer 25A and the dielectric layer 20 adjacent to the lower side, in FIG. 5A, of the first step layer 25A is covered and closed by the first protruded portion 27A. As illustrated in FIG. 5B, the first protruded portion 27A extending in the width directions W of the multilayer body 10, and the interface 29*a* extending in the width directions W is covered by the first protruded portion 27A over the entirety or substantially the entirety of its length.

The first protruded portion 27A may protrude from an entire or substantially an entire surface of or may protrude from a portion of the region of the first step layer 25A on the first end surface LS1. Furthermore, although a region on the end surface 20*a* of the dielectric layer 20, which the first protruded portion 27A covers, is not limited, it is preferable that the protruded portion is at least provided with, for example, a dimension that is equal to or higher than about 3% of the length, in the lamination directions T, of the end surface 20*a*. Thus, the interface 29*a* is securely covered by the first protruded portion 27A.

It is preferable that, as illustrated in FIG. 5A, an amount of protrusion G1 of the first protruded portion 27A protruding, in the one of the length directions L, from the end surface 20*a* of the dielectric layer 20, which defines the first end surface LS1, is, for example, equal to or less than about 98% of a thickness H2 that is a dimension, in the lamination directions T, of the second internal electrode layer 32.

The second protruded portion 27B has a configuration the same as or similar to the configuration of the first protruded portion 27A. That is, as illustrated in FIGS. 6A and 6B, the plurality of second protruded portions 27B are each provided in a region including a location corresponding to the second step layer 25B, on the second end surface LS2. The second protruded portion 27B is provided as a portion of a ceramic material of the second step layer 25B that protrudes from the second step layer 25B in the other one of the length directions L of the multilayer body 10. The second protruded portion 27B is partially protruding, from the second step layer 25B, in a region including the dielectric layer 20 adjacent to the second step layer 25B.

The second protruded portion 27B according to the present example embodiment extends downward from the second step layer 25B along an end surface 20*b* of the dielectric layer 20 adjacent to its one side in the lamination directions T (a lower side in FIG. 6A) and covering the end surface 20*b*. Therefore, such a state is obtained that, on the second end surface LS2, an interface 29*b* between the second step layer 25B and the dielectric layer 20 adjacent to the lower side, in FIG. 6A, of the second step layer 25B is covered and closed by the second protruded portion 27B. As illustrated in FIG. 6B, the second protruded portion 27B extending in the width directions W of the multilayer body 10, and the interface 29*b* extending in the width directions W is covered by the second protruded portion 27B over the entirety or substantially the entirety of its length.

The second protruded portion 27B may protrude from an entire or substantially an entire surface of or may protrude from a portion of the region of the second step layer 25B on the second end surface LS2. Furthermore, although a region of the end surface 20*b* of the dielectric layer 20, which the second protruded portion 27B covers, is not limited, it is preferable that the protruded portion is at least provided with a dimension that is, for example, equal to or higher than about 3% of the length, in the lamination directions T, of the end surface 20*b*. Thus, the interface 29*b* is securely covered by the second protruded portion 27B.

As will be described later, the first protruded portions 27A and the second protruded portions 27B may be integrated with the dielectric layers 20, respectively, when the multilayer body 10 is fired in the course of manufacturing. Therefore, as to the first protruded portions 27A, a state where the first protruded portion 27A covers the end surface 20*a* and the interface 29*a* as described above is a state where the multilayer body 10 is a formed body before fired and it is possible to differentiate a material of the first protruded portion 27A and a material of the dielectric layer 20 from each other. Similarly, as to the second protruded portions 27B, a state where the second protruded portion 27B covers the end surface 20*b* and the interface 29*b* as described above is a state where the multilayer body 10 is a formed body before fired and it is possible to differentiate a material of the second protruded portion 27B and a material of the dielectric layer 20 from each other. The expression that the first protruded portion 27A and the second protruded portion 27B cover the end surface 20*a* and the end surface 20*b* or the interface 29*a* and the interface 29*b*, respectively, in the above description is based on a concept that, even when the first protruded portion 27A and the second protruded portion 27B have been integrated with the dielectric layers 20, respectively, the multilayer body 10 is a formed body before fired, as described above.

It is preferable that, an amount of protrusion G2 of the second protruded portion 27B protruding, in the other one of the length directions L, from the end surface 20*b* of the dielectric layer 20, which defines the second end surface LS2, is, for example, equal to or less than about 98% of a thickness H1 that is a dimension, in the lamination directions T, of the first internal electrode layer 31.

It is possible to measure and confirm a ratio (for example, equal to or less than about 98%, as described above) of the amount of protrusion G1 and the amount of protrusion G2 described above of the first protruded portion 27A and the second protruded portion 27B with respect to the thicknesses of the internal electrode layers 30, respectively, as described below. That is, the first side surface WS1 or the second side surface WS2 is polished to approximately ½ of the dimension, in the width directions, of the multilayer ceramic capacitor 1, for example, to cause the LT cross section to be exposed. Next, the amount of protrusion G1 and the amount of protrusion G2 are measured at desired positions on the polished surface. After that, the thicknesses H1 and H2 of the internal electrode layers 30 are measured, respectively, to calculate the values from G1/H1 and G2/H2. It is possible to measure the thicknesses of the portions by using a scanning electron microscope (SEM), for example. Furthermore, it is possible to similarly measure and calculate a ratio (for example, equal to or higher than about 3% as described above) of the dimension that the first protruded portion 27A and the second protruded portion 27B cover the end surface 20*a* and the end surface 20*b* of the dielectric layers 20, respectively, in the lamination directions.

Manufacturing Method

The configuration of the multilayer ceramic capacitor 1 according to the present example embodiment has been described above. Next, an example of a method of manufacturing the multilayer ceramic capacitor 1 will now be described herein. The method of manufacturing the multilayer ceramic capacitor 1 according to the present example embodiment is not limited, as long as the requirements described above are satisfied. However, a preferable manufacturing method includes steps described below.

Dielectric sheets for the dielectric layers 20, an electrically-conductive paste for the internal electrode layers 30, and a dielectric paste for the step layers 25 are prepared. The dielectric sheets, the electrically-conductive paste, and the dielectric paste each include a binder and a solvent. It is possible to use a known binder and a known solvent. It is possible to use a binder and a solvent for the dielectric paste for the step layers 25, which have been changed in amount from of a binder and a solvent for the dielectric sheets. The electrically-conductive paste is acquired by adding an organic binder and an organic solvent to a metallic powder, for example.

Screen printing or gravure printing, for example, is used to print the electrically-conductive paste for the plurality of internal electrode layers 30 in predetermined patterns on the dielectric sheets. Thus, the dielectric sheets formed with the patterns of the plurality of first internal electrode layers 31 and the dielectric sheets formed with the patterns of the plurality of second internal electrode layers 32 are prepared. Next, screen printing, for example, is used to print the dielectric paste for the step layers 25 in regions where the patterns of the internal electrode layers 30 are not formed, that is, the plurality of first step region 26A and the plurality of second step region 26B, on the dielectric sheets printed with the patterns of the internal electrode layers 30 to form patterns of the plurality of step layers 25.

The patterns of the plurality of step layers 25 may be first formed by using the dielectric paste, and, after that, the patterns of the plurality of internal electrode layers 30 may be formed by using the electrically-conductive paste.

Next, a predetermined number of the dielectric sheets where the patterns of the internal electrode layers 30 are not printed are laminated to form portions defining and functioning as the first main surface side outer layer portions 12 on the side of a plurality of the first main surfaces TS1. On the portions, the dielectric sheets printed with the patterns of the plurality of first internal electrode layers 31 and the plurality of second step layers 25B and the dielectric sheets printed with the patterns of the plurality of second internal electrode layers 32 and the plurality of first step layers 25A are sequentially and alternately laminated with each other to form portions serving as a plurality of the effective layer portions 11. On the portions defining and functioning as the effective layer portions 11, a predetermined number of the dielectric sheets where the patterns of the internal electrode layers 30 are not printed are laminated to form portions serving as the second main surface side outer layer portions 13 on the side of a plurality of the second main surfaces TS2. Thus, multilayer sheets including portions may include a plurality of the multilayer bodies 10 are acquired.

Next, the multilayer sheets are pressed in the lamination directions T with a method such as, for example, isostatic pressing to produce a multilayer block.

Next, the multilayer block is cut into pieces to each have a predetermined size to acquire a plurality of multilayer chips defining and functioning as a plurality of raw materials for the multilayer bodies 10. After that, barrel polishing, for example, may be used to polish the plurality of multilayer chips to round corner portions and ridge portions.

Next, a heat treatment is performed to heat the acquired plurality of multilayer chips to a temperature equal to or higher than about 100° C. and equal to or less than about 200° C., for example. At this time, as the binder component and the solvent component in the dielectric paste for the step layers 25 are evaporated and removed, portions of the first step layers 25A flow and protrude, the protruded portions further flow along the end surfaces 20*a* of the dielectric layers 20, and the first protruded portions 27A are formed, respectively, on the side of the first end surfaces LS1. Furthermore, portions of the second step layers 25B flow and protrude, the protruded portions further flow along the end surfaces 20*b* of the dielectric layers 20, and the second protruded portions 27B are formed, respectively, on the side of the second end surfaces LS2. It is possible to change a temperature for the heat treatment and a period of time for the heat treatment at this time to adjust amounts of flow and thicknesses of the first protruded portions 27A and the second protruded portions 27B along the end surfaces of the dielectric layers 20 to achieve the first protruded portions 27A and the second protruded portions 27B each having a desired shape and desired dimensions.

The thicknesses of the first step layers 25A may become thinner as portions of the first step layers 25A flow from the first end surface LS1 to form the first protruded portions 27A, respectively. Furthermore, the thicknesses of the second step layers 25B may become thinner as portions of the second step layers 25B flow from the second end surface LS2 to form the second protruded portions 27B, respectively. However, the displacement of the thicknesses is not significant, and, as the first step layers 25A and the second step layers 25B are provided, the thicknesses at both the ends, in the length directions L, of the multilayer body 10 may rarely decrease.

After that, the multilayer chips are fired to acquire the multilayer bodies 10. It is preferable that a firing temperature at this time is equal to or higher than about 900° C. and equal to or less than about 1400° C., depending on the materials of the dielectric layers 20 and the internal electrode layers 30, for example. When the first step layers 25A and the second step layers 25B are formed by using a ceramic material the same as a ceramic material of the dielectric layers 20, for example, the first protruded portions 27A and the second protruded portions 27B after fired may be integrated with the dielectric layers 20, respectively. In that case, when the first end surface LS1 is viewed, it may be difficult to differentiate the first protruded portions 27A and the end surfaces 20*a* of the dielectric layers 20 from each other in appearance, and, when the second end surface LS2 is viewed, it may be difficult to differentiate the second protruded portions 27B and the end surfaces 20*b* of the dielectric layers 20 from each other in appearance.

Next, the external electrodes 40 are to be formed at both of the ends, in the length directions L, of the multilayer body 10 with a procedure described below. The first base electrode layer 50A and the second base electrode layer 50B defining and functioning as base electrode layers are first formed.

When fired layers are used to form the base electrode layers, the first end surface LS1 and the second end surface LS2 of the multilayer body 10 are applied with an electrically-conductive paste defining and functioning as the base electrode layers to form the first base electrode layer 50A and the second base electrode layer 50B. To form the fired layers, an electrically-conductive paste including a glass component and a metal is applied with a method such as, for example, dipping, and, after that, a firing treatment is performed to form the base electrode layers. It is preferable that an approximate temperature for the firing treatment at this time be equal to or higher than about 700° C. and equal to about 900° C., for example.

To use layers including electrically-conductive resin layers as the base electrode layers, an electrically-conductive resin paste including a thermosetting resin and a metal component is applied onto the fired layers or onto the multilayer body 10, and a heat treatment is performed at an approximate temperature, for example, equal to or higher than about 250° C. and equal to or higher than about 550° C. to cause the resin to be heat-hardened to form the electrically-conductive resin layers. It is preferable that an atmosphere when the heat treatment is to be performed at this time is, for example, an $N_2$ atmosphere. Furthermore, to prevent scattering of a resin and to prevent oxidation of various types of metal components, it is preferable that a heat treatment is performed in an atmosphere where a concentration of oxygen is suppressed to a value equal to or less than about 100 ppm, for example.

When thin film layers are used to form the base electrode layers, thin film layers defining and functioning as the base electrode layers are formed on the multilayer body 10 with a thin film forming method such as a sputtering method or an evaporation method, for example. It is preferable that the base electrode layers formed by using the thin film layers are layers each accumulated with metal particles to have a thickness equal to or less than about 1 μm, for example.

After the base electrode layers are formed as described above, the first plated layer 60A and the second plated layer 60B are sequentially formed on the base electrode layers with a barrel plating method, for example.

When plated layers are only used to form the external electrodes 40 without forming base electrode layers, a plating treatment is performed on the first end surface LS1 and the second end surface LS2 of the multilayer body 10 to form base plating films on exposed surfaces of the internal electrode layers 30. Although electrolytic plating or non-electrolytic plating may be used to perform a plating treatment, non-electrolytic plating is disadvantageous because preliminary processing using a catalyst is necessary to improve a plating deposition rate, leading to complicated steps. Therefore, it is preferable to use electrolytic plating in normal cases. It is preferable to use barrel plating as a plating method. Furthermore, an upper layer plating electrode formed on a surface of a lower layer plating electrode may be similarly formed as necessary.

The multilayer ceramic capacitor 1 is manufactured with the manufacturing steps described above.

Figure 7A:
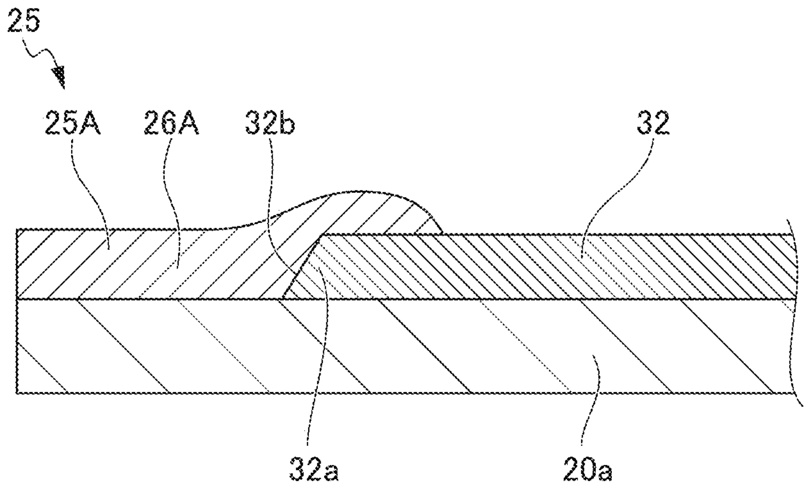
FIG. 7A is a cross-sectional view schematically illustrating an example where, to print a dielectric paste for step layers on ceramic sheets, the dielectric paste for step layers is printed to cover ends of an electrically-conductive paste for internal electrode layers, in a manufacturing method according to an example embodiment of the present invention.

When the pattern of the first step layer 25A is to be printed on the dielectric sheet to produce a multilayer chip in the manufacturing method described above, a dielectric paste for the first step layers 25A may cover, in the first step region 26A, an end 32*a*, on a first end surface side, of the second internal electrode layer 32 in the lamination directions T, as illustrated in FIG. 7A. Furthermore, in this case, an end surface 32*b*, on the first end surface side, of the second internal electrode layer 32 may be formed into a tapered shape to protrude, toward the side of the first step region 26A as the surface approaches the dielectric sheet for the dielectric layer 20 downwardly in FIG. 7A.

Figure 7B:
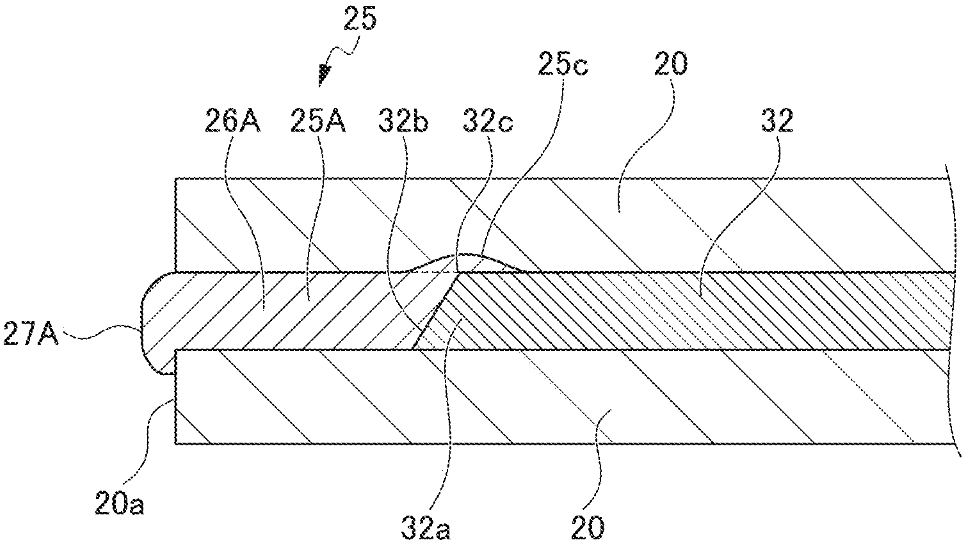
FIG. 7B is a cross-sectional view illustrating a state on a first end surface side, in a multilayer ceramic capacitor acquired by laminating the ceramic sheets illustrated in FIG. 7A.

In the multilayer ceramic capacitor 1 acquired when the patterns of the first step layers 25A are formed as illustrated in FIG. 7A, an excess 25*c* covering the second internal electrode layer 32, which is a portion of the first step layer 25A, covers the end 32*a* of the second internal electrode layer 32 in the lamination directions T, as illustrated in FIG. 7B. Thus, an interface 32*c* between the first step layer 25A and the end 32*a* of the second internal electrode layer 32 is covered and closed by the first step layer 25A. Therefore, the first step layers 25A reduce or prevent infiltration of moisture into the interfaces, improving reliability in moisture resistance. Furthermore, since the first step regions 26A are fully filled with the first step layers 25A, respectively, the thicknesses at the ends on the side of the first end surface LS1 may rarely decrease even after pressing. Furthermore, there is provided with the first step layers 25A at enough amounts, it is possible to easily form the first protruded portions 27A. Although not illustrated, it is possible to similarly form the patterns of the second step layers 25B in the second step regions 26B.

Contrary to the aspect described above, the ends of the internal electrode layers 30 may cover portions of the step layers 25, respectively.

The multilayer ceramic capacitor 1 according to the present example embodiment described above provides the advantageous effects described below.

The multilayer ceramic capacitor 1 according to the present example embodiment includes the multilayer body 10 including the dielectric layers 20 defining and functioning as the plurality of ceramic layers laminated in the lamination directions T, the first main surface TS1 and the second main surface TS2 facing each other in the lamination directions T, the first side surface WS1 and the second side surface WS2 facing each other in the width directions W orthogonal or substantially orthogonal to the lamination directions T, the first end surface LS1 and the second end surface LS2 facing each other in the length directions L orthogonal or substantially orthogonal to the lamination directions T and the width directions W, the first internal electrode layers 31 alternately laminated with the plurality of dielectric layers 20, the first internal electrode layers 31 being exposed at the first end surface LS1, the second internal electrode layers 32 alternately laminated with the plurality of dielectric layers 20, the second internal electrode layers 32 being exposed at the second end surface LS2, the first step layers 25A each located in the first step region 26A in which a corresponding one of the second internal electrode layers 32 is not located, between a pair of the dielectric layers 20 facing each other via the corresponding one of the second internal electrode layers 32, the first step layers 25A being exposed at the first end surface LS1, and the second step layers 25B each located in the second step region 26B in which a corresponding one of the first internal electrode layers 31 is not located, between a pair of the dielectric layers 20 facing each other via the corresponding one of the first internal electrode layers 31, the second step layers 25B being exposed at the second end surface LS2, the first external electrode 40A on the first end surface LS1, the first external electrode 40A partially covering the first main surface TS1, the second main surface TS2, the first side surface WS1, and the second side surface WS2 from the first end surface LS1, the first external electrode 40A being coupled to the first internal electrode layers 31, and the second external electrode 40B on the second end surface LS2, the second external electrode 40B partially covering the first main surface TS1, the second main surface TS2, the first side surface WS1, and the second side surface WS2 from the second end surface LS2, the second external electrode 40B being coupled to the second internal electrode layers 32, in which the first end surface LS1 includes the first protruded portions 27A each partially protruding in the one of the length directions L, from a corresponding one of the first step layers 25A, in a region including a corresponding one of the dielectric layers 20, the corresponding one of the dielectric layers 20 being adjacent to at least one side, in the lamination directions T, of the corresponding one of the first step layers 25A, and the second end surface LS2 includes the second protruded portions 27B each partially protruding in another one of the length directions L, from a corresponding one of the second step layers 25B, in a region including another corresponding one of the dielectric layers 20, the other corresponding one of the dielectric layers 20 being adjacent to at least one side, in the lamination directions T, of the corresponding one of the second step layers 25B.

The plurality of first protruded portions 27A corresponding to the plurality of first step layers 25A are in a state of partially protruding and embedded in the first external electrode 40A cover the first end surface LS1. Therefore, an inner surface of the first external electrode 40A, which is in close contact with the first end surface LS1, includes a plurality of recessed portions to which the plurality of first protruded portions 27A have been transferred. As illustrated in FIG. 5A, the recessed portions extend to regions of the dielectric layers 20, respectively. As the plurality of first protruded portions 27A are embedded in the first external electrode 40A, an anchoring effect is obtained where the first external electrode 40A is caught by the first protruded portions 27A, making it difficult to peel off. Similarly, the second protruded portions 27B corresponding to the plurality of second step layers 25B are in a state of partially protruding and embedded in the second external electrode 40B covering the second end surface LS2. Therefore, an inner surface of the second external electrode 40B, which is in close contact with the second end surface LS2, includes a plurality of recessed portions to which the plurality of second protruded portions 27B have been transferred. As illustrated in FIG. 6A, the recessed portions extend to regions of the dielectric layers 20, respectively. As the plurality of second protruded portions 27B are embedded in the second external electrode 40B, an anchoring effect is obtained where the second external electrode 40B is caught by the second protruded portions 27B, making it difficult to peel off. Therefore, the fixing power of the first external electrode 40A and the second external electrode 40B with respect to the multilayer body 10 is improved. As a result, the reliability of the multilayer ceramic capacitor 1 is improved.

Furthermore, the first protruded portions 27A cover and close the interfaces 29*a* between the first step layers 25A and the dielectric layers 20 on the first end surface LS1, respectively, and cover and close the interfaces 29*b* between the second step layers 25B and the dielectric layers 20 on the second end surface LS2, respectively. Therefore, the first protruded portions 27A and the second protruded portions 27B reduce or prevent infiltration of moisture from outside into the interfaces 29*a* and 29*b*, thus improving the reliability in moisture resistance. Furthermore, routes from outside to the interfaces 29*a* and 29*b* that extend to each have a complicated shape due to the first protruded portions 27A and the second protruded portions 27B, thus reducing or preventing infiltration of moisture and improving reliability in moisture resistance.

In the multilayer ceramic capacitor 1 according to the present example embodiment, it is preferable that the first protruded portions 27A and the second protruded portions 27B each have a dimension that is equal to or higher than about 3% of the length, in the lamination directions T, of each of the end surface 20*a* and the end surface 20*b* of the dielectric layers 20.

Thus, the interfaces 29*a* and the interfaces 29*b* described above are securely covered by the first protruded portions 27A and the second protruded portions 27B, respectively, thus improving the reliability in moisture resistance.

It is preferable that, in the multilayer ceramic capacitor 1 according to the present example embodiment, the amount of protrusion G1 of the first protruded portion 27A protruding, in the one of the length directions L, from the end surface 20*a* of the dielectric layer 20, which defines the first end surface LS1, is equal to or less than about 98% of the dimension H2, in the lamination directions T, of the second internal electrode layer 32, and the amount of protrusion G2 of the second protruded portion 27B protruding, in the other one of the length directions L, from the end surface 20*b* of the dielectric layer 20, which defines the second end surface LS2, is equal to or less than about 98% of the dimension H1, in the lamination directions T, of the first internal electrode layer 31.

Thus, it is possible to provide a sufficient amount of protrusion G1 of the first protruded portion 27A protruding, in the one of the length directions L, from the end surface 20*a* of the dielectric layer 20 and a sufficient amount of protrusion G2 of the second protruded portion 27B protruding, in the other one of the length directions L, from the end surface 20*b* of the dielectric layer 20. Therefore, a higher anchoring effect is achieved by the first protruded portions 27A and the second protruded portions 27B, thus improving the fixing power of the first external electrode 40A and the second external electrode 40B with respect to the multilayer body 10.

It is preferable that, in the multilayer ceramic capacitor 1 according to the present example embodiment, the first step layer 25A covers the end, on the side of the first end surface LS1, of the second internal electrode layer 32 in the one of the lamination directions T, and the second step layer 25B at least covers the end, on the side of the second end surface LS2, of the first internal electrode layer 31 in the other one of the lamination directions T.

Thus, the first step region 26A is fully filled with the first step layer 25A, and the second step region 26B is fully filled with the second step layer 25B. Therefore, the first protruded portions 27A and the second protruded portions 27B each include a sufficient amount of protrusion, with which the thicknesses at both of the ends, in length directions L, of the multilayer body 10 rarely decrease, are securely provided. Furthermore, infiltration of moisture into the interfaces between the step layers 25 and the internal electrode layers 30 joining each other is reduced or prevented, thus improving reliability in moisture resistance.

The present invention is not limited to the configuration of the example embodiments described above, and is able to be appropriately modified and applied without changing the scope of the present invention. The present invention also includes a combination of two or more example embodiments.

For example, the first protruded portions 27A and the second protruded portions 27B, which are provided to each cover, from each of the step layers, each of the dielectric layers 20 on one side (the lower side in FIGS. 5A and 6A) in the lamination directions T, in one of the example embodiments described above, may each be provided on an opposite side. That is, the protruded portions may protrude to each cover the dielectric layer 20 on another side (an upper side in FIGS. 5A and 6A) in the lamination directions T.

Although the example embodiments described above include the protruded portions protruding from the step layers on end surfaces (the first end surface LS1 and the second end surface LS2) at both of the ends, in the length directions L, of the multilayer body 10, such protruded portions may be, when there are step layers on sides of the side surfaces (the first side surface WS1 and the second side surface WS2) of the multilayer body 10, protruding from the step layers on the sides of the side surfaces, respectively. That is, the multilayer body 10 may be provided with, between the dielectric layers 20 and at ends on a side of the first side surface WS1 and an end on a side of the second side surface WS2, third step regions where either the first internal electrode layer 31 or the second internal electrode layer 32 is not provided, respectively, and the third step regions may be provided with third step layers, respectively. In this case, such a configuration may be applied such that the first side surface WS1 and the second side surface WS2 are each provided with third protruded portions each partially protruding in either of the width directions W, from a corresponding one of the third step layers, in a region including a corresponding one of the dielectric layers 20, the corresponding one of the dielectric layers 20 being adjacent to at least one side, in the one of the lamination directions, of the corresponding one of the third step layers. In the configuration where the protruded portions protrude from the step layers on the side surface sides, respectively, as described above, an anchoring effect is obtained where portions of the external electrodes 40, which partially cover the first side surface WS1 and the second side surface WS2, are caught by the protruded portions, making it difficult to peel off, and thus improving fixing power of the external electrodes 40. Furthermore, infiltration of moisture from the first side surface WS1 and the second side surface WS2 is also reduced or prevented, thus improving reliability in moisture resistance.

Furthermore, in the example embodiments described above, a multilayer ceramic capacitor has been described as a multilayer ceramic electronic component. However, the multilayer ceramic electronic component according to example embodiments of the present invention are not limited to this example. For example, when a piezoelectric ceramic is used for a multilayer body, the multilayer ceramic electronic component defines and functions as a ceramic piezoelectric element. A specific example of a piezoelectric ceramic material is a PZT (lead zirconate titanate) based ceramic material. Furthermore, when a semiconductor ceramic is used for a multilayer body, the multilayer ceramic electronic component defines and functions as a thermistor element. A specific example of a semiconductor ceramic material is a spinel based ceramic material. Furthermore, when a magnetic ceramic is used for a multilayer body, the multilayer ceramic electronic component defines and functions as an inductor element. Furthermore, when the component defines and functions as an inductor element, coil-shaped electrical conductors are applied as internal electrode layers. A specific example of a magnetic ceramic material is a ferritic ceramic material.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:

a multilayer body including:

a plurality of dielectric layers;

a first main surface and a second main surface facing each other in the lamination directions;

a first side surface and a second side surface facing each other in width directions orthogonal or substantially orthogonal to the lamination directions;

a first end surface and a second end surface facing each other in length directions orthogonal or substantially orthogonal to the lamination directions and the width directions;

a plurality of first internal electrode layers each including one end exposed at the first end surface;

a plurality of second internal electrode layers each including one end exposed at the second end surface; and first step layers each disposed between a corresponding one of the plurality of second internal electrode layers and the first end surface, and each including a dielectric material;

a first external electrode disposed on the first end surface, the first main surface, the second main surface, the first side surface, and the second side surface; and a second external electrode disposed on the second end surface, the first main surface, the second main surface, the first side surface, and the second side surface; wherein each of the first step layers protrudes outward in one of the length directions and covers and closes an interface, on the first end surface, between a corresponding one of the first step layers and a corresponding one of the plurality of dielectric layers adjacent to the corresponding one of the first step layers in the lamination directions;

on the first end surface, the corresponding one of the first step layers covers a portion of the corresponding one of the plurality of dielectric layers; and a distance, in the lamination directions on the first end surface, between a first internal electrode layer closest to the first main surface and a first internal electrode layer closest to the second main surface among the plurality of first internal electrode layers is shorter than a distance, in the lamination directions, between a counter portion where the first internal electrode layer closest to the first main surface among the plurality of first internal electrode layers faces a second internal electrode layer closest to the first main surface among the plurality of second internal electrode layers, and a counter portion where the first internal electrode layer closest to the second main surface among the plurality of first internal electrode layers faces a second internal electrode layer closest to the second main surface among the plurality of second internal electrode layers.

2. The multilayer ceramic electronic component according to claim 1, wherein the protrusions of the first step layers each have a dimension equal to or greater than about 3% of a length, in the lamination directions, of an end surface of a corresponding one of the dielectric layers.

3. The multilayer ceramic electronic component according to claim 1, wherein an amount of protrusion of each of the first step layers in the one of the length directions from an end surface of the corresponding one of the dielectric layers, the end surface forming the first end surface, is equal to or less than about 98% of a dimension, in the lamination directions, of a corresponding one of the second internal electrode layers.

4. The multilayer ceramic electronic component according claim 1, wherein the first step layers each cover an end, on a side of the first end surface, of the corresponding one of the second internal electrode layers in the lamination directions.

5. The multilayer ceramic electronic component according to claim 1, further comprising:

third step layers each disposed between a corresponding one of the plurality of first internal electrode layers or a corresponding one of the plurality of second internal electrode layers, and the first side surface or the second side surface; wherein each of the third step layers protrudes outward in one of the width directions and covers and closes an interface, on the first side surface or the second side surface, between a corresponding one of the third step layers and a corresponding one of the plurality of dielectric layers adjacent to the corresponding one of the third step layers in the lamination directions; and on the first side surface or the second side surface, the corresponding one of the first step layers covers a portion of the corresponding one of the plurality of dielectric layers.

6. The multilayer ceramic electronic component according to claim 1, wherein a dimension of the multilayer body in the length directions is equal to or greater than about 0.2 mm and equal to or less than about 6 mm;

a dimension of the multilayer body in the lamination directions is equal to or greater than about 0.05 mm and equal to or less than about 5 mm; and a dimension of the multilayer body in the width directions is equal to or greater than about 0.1 mm and equal to or less than about 5 mm.

7. The multilayer ceramic electronic component according to claim 1, wherein each of the plurality of dielectric layers includes $BaTiO_3$, $CaTiO_3$, $SrTiO_3$, or $CaZrO_3$ as a main component.

8. The multilayer ceramic electronic component according to claim 7, wherein each of the plurality of dielectric layers includes a Mn chemical compound, a Fe chemical compound, a Cr chemical compound, a Co chemical compound, or a Ni chemical compound as a subcomponent.

9. The multilayer ceramic electronic component according to claim 1, wherein each of the plurality of dielectric layers includes a plurality of crystal particles including a perovskite chemical compound including $BaTiO_3$.

10. The multilayer ceramic electronic component according to claim 9, wherein a diameter of each of the plurality crystal particles is equal to or smaller than about 1 μm.

11. The multilayer ceramic electronic component according to claim 1, wherein a thickness of each of the plurality of dielectric layers is equal to or less than about 10 μm.

12. The multilayer ceramic electronic component according to claim 1, wherein a number of the plurality of dielectric layers is equal to or greater than 10 and equal to or smaller than 2000.

13. The multilayer ceramic electronic component according to claim 1, wherein each of the first and second internal electrode layers includes Ni, Cu, Ag, Pd, or Au or an alloy including at least one of Ni, Cu, Ag, Pd, or Au.

14. The multilayer ceramic electronic component according to claim 1, wherein a thickness of each of the first and second internal electrode layers is equal to or greater than about 0.2 μm and equal to or thinner than about 2.0 μm.

15. The multilayer ceramic electronic component according to claim 1, wherein each of the first and second external electrodes includes a base electrode layer and a plated layer on the base electrode layer.

16. The multilayer ceramic electronic component according to claim 15, wherein the base electrode layer is a fired layer including a glass component and a metal component.

17. The multilayer ceramic electronic component according to claim 16, wherein the glass component includes at least one of B, Si, Ba, Mg, Al, or Li.

18. The multilayer ceramic electronic component according to claim 16, wherein the metal component includes at least one of Cu, Ni, Ag, Pd, Ag—Pd alloy, or Au.

19. The multilayer ceramic electronic component according to claim 1, wherein each of the first step layers covers an entirety of a length of the interface between a corresponding one of the first step layers and a corresponding one of the plurality of dielectric layers in the width directions.

20. The multilayer ceramic electronic component according to claim 1, wherein each of the first step layers covers an interface between a corresponding one of the first step layers and a corresponding one of the plurality of dielectric layers adjacent on one side in the lamination directions and an interface between the corresponding one of the first step layers and a corresponding one of the plurality of dielectric layers adjacent on the other side in the lamination directions.

* * * * *